United States Patent [19]
Blaga

[11] Patent Number: 5,390,690
[45] Date of Patent: Feb. 21, 1995

[54] MIXING VALVE AND FLUID TRANSFER SYSTEM VALVED AT PRESSURIZED CENTRAL HEADER TO PROVIDE UNPRESSURIZED DELIVERY CONDUITS

[76] Inventor: Alexandru Blaga, 249 Ocean Pkwy., Apt. 5A, Brooklyn, N.Y. 11218

[21] Appl. No.: 102,741

[22] Filed: Aug. 6, 1993

[51] Int. Cl.⁶ .............................................. F16K 11/20
[52] U.S. Cl. .................................... 137/1; 137/597; 137/607
[58] Field of Search ............... 137/597, 607, 606, 627, 137/630.19, 1, 3, 594, 595

[56] References Cited

U.S. PATENT DOCUMENTS

| | | | |
|---|---|---|---|
| 900,485 | 10/1908 | Cook | 137/594 |
| 1,836,854 | 12/1931 | Leland | 137/597 X |
| 2,599,997 | 6/1952 | Iannelli | 137/630.19 |
| 3,182,677 | 5/1965 | Thiem | 137/607 X |
| 3,405,733 | 10/1968 | Hansen | 137/627 X |
| 3,508,604 | 4/1970 | Foust | 137/594 |
| 4,194,535 | 3/1980 | Galland et al. | 137/601 X |
| 4,444,215 | 4/1984 | Zukausky | 137/597 X |
| 4,901,750 | 2/1990 | Nicklas et al. | 137/607 X |
| 4,945,943 | 8/1990 | Cogger | 137/607 X |
| 4,967,794 | 11/1990 | Tsutsui et al. | 137/597 |
| 5,058,624 | 10/1991 | Kolze | 137/607 |
| 5,107,883 | 4/1992 | Shaw | 137/597 X |

FOREIGN PATENT DOCUMENTS

| | | | |
|---|---|---|---|
| 1179993 | 12/1956 | France | 137/597 |
| 2126114 | 12/1972 | Germany | 137/597 |

Primary Examiner—Stephen M. Hepperle
Attorney, Agent, or Firm—Roper & Quigg

[57] ABSTRACT

A mixing valve housing containing two separated inlet chambers and a plurality of valve units which are individually operated from remote positions provides mixed fluid through outlet lines from the individual valve units to destinations remote from the valve housing. An optional flow equalizing apparatus provides balance in the amount of flow from the inlet chambers to each valve unit outlet. All of the valve units in the valve housing have alternative mechanical systems that can be operated using commercial power source or utilize the pressure of the fluid in the inlet chambers for operation. By connecting these mixing valve housings to a pair of centrally located, pressurized headers the need for constant pressure in delivery conduits throughout a structure is eliminated.

44 Claims, 10 Drawing Sheets

MIXING VALVE AND FLUID TRANSFER SYSTEM VALVED AT PRESSURIZED CENTRAL HEADER TO PROVIDE UNPRESSURIZED DELIVERY CONDUITS

BACKGROUND OF THE INVENTION

1. Field of the Invention

This invention relates to delivery systems for fluids. The invention relates to the delivery of liquids, gases, and mixtures thereof. More particularly it relates to providing fluid delivery from a central pressurized header to a delivery point through a delivery conduit that does not remain under pressure between deliveries of fluid. Most particularly the invention relates to the delivery of water at a desired temperature by mixing relatively hot and cold water from pressurized headers to provide a tempered mixture in a single delivery conduit with control of the flow at a point of delivery which is remote from the pressurized headers. The invention further relates to providing means by which operation of valving at a header is manipulated from a remote delivery point and to providing a mixing valve particularly adapted for use in a delivery system as described above.

2. Description of the Present State of the Field of the Invention

In most operations in which a fluid, particularly water, is delivered from a header to a delivery point the delivery conduit is pressurized to a means of closure at the point of delivery. There are, however, instances in which, because of safety considerations or for reasons of reduced cost of construction or maintenance, it is advantageous to provide a pressurized header at a centralized position and deliver fluid to points at a distance from the header through delivery conduits that are not continuously maintained under pressure.

It would, therefore, be advantageous to have a process and apparatus by which transfer of a fluid, particularly a hazardous fluid, from a pressurized header could be accomplished through a delivery conduit that is self draining, controlling the opening of a header valve from a point near the point of delivery thereby reducing to a minimum the time and area in which the fluid being delivered is maintained under pressure.

It would also be advantageous to have a process and apparatus by which the construction and maintenance costs of multiple unit housing or office space could be reduced by providing fluids, such as hot and cold water, in centralized, pressurized headers with withdrawal from these headers into a mixing valve for delivery of tempered water at a remote delivery point with the operation of the valve at the centralized header being controlled at the remote delivery point.

In the present invention not only are the advantages set out above accomplished, but also by the positioning of the height of the delivery point in relation to the height of the take off point at the pressurized header the delivery conduits can be maintained as empty or fluid full but unpressurized. This not only reduces the possibility of leakage damage by half by substituting one delivery conduit for two to each point of delivery, but also reduces leakage damage because the delivery conduits are not pressurized. It also allows the use of cheaper construction material in the delivery conduits which in some instances, such as allowing the substitution of plastic for copper, not only reduces the construction and replacement cost but also reduces the temptation to pilfer the delivery conduit piping. The present invention also eliminates the expense of the use of valving at the point of delivery of the water.

Operation of a fluid delivery system as described above is facilitated by providing a mixing valve that can be installed at the pressurized headers and can be controlled from a point of delivery of the mixed liquid that is remote from the valve. The efficiency of the mixing valve is further facilitated by having the closure mechanism of the valve operated by alternative power sources built into the valve.

It is, therefore, an object of this invention to provide a delivery system for fluids.

It is another object of the invention to provide a fluid delivery system in which at least one valve on a centralized, pressured header is operated to discharge fluid through a delivery conduit to a delivery point remote from the centralized, pressured header.

It is a further object of the invention to provide a system in which a delivery conduit is not pressurized from the centralized header to the delivery point when fluid is not being transferred through the conduit. It is another object of this invention to provide a valve operable from a remote point of control.

It is yet another object of this invention to provide a control system for a header valve enabling the delivery of fluid to be controlled from the point of delivery of the fluid which is remote from the header valve.

It is yet another object of this invention to provide a valve that is operated using the force of the header pressure of the fluid within the valve body to power the opening and closing of the valve.

It is another object of this invention to provide a valve for mixing fluids. Preferably, the valve for mixing fluids is provided with alternative mechanisms by which the liquid flow to a mixing chamber in the valve can be controlled by alternatively using combinations of standard commercial electricity, reserve low voltage backup battery electricity, header pressure in a liquid transfer system and a compressed gas backup system.

Another object of the invention is to provide means for minimizing the effects of pressure differentials caused by surges in the pressure of the fluid entering the mixing valve.

These and other aspects and objects of the invention will become apparent on studying the following specification and claims along with the appended drawings.

SUMMARY OF THE INVENTION

The present invention provides a fluid mixing valve which is used in a fluid delivery system to allow a mixed fluid, most specifically tempered water in a household setting, to be delivered from a pair of pressured conduit headers through a single delivery conduit to a delivery point remote from the pressured conduit headers with the flow from the headers controlled at the remote delivery point.

In accordance with this invention, apparatus is provided for the controlled transferring of a fluid from a pressurized header to a delivery point that is remote from the pressurized header which apparatus is (a) a header suitable for containing pressurized fluid, (b) a valve operably attached to regulate fluid flow from the header and operably attached to discharge fluid into (c) a delivery conduit extending to an open-ended delivery point remote from the header and (d) control means for operating the valve.

Further in accordance with the invention, (e) means are provided for maintaining the delivery conduit essentially liquid full and, yet further in accordance with the invention, (f) means are provided for closing the end of the delivery conduit so that, essentially liquid full, the delivery conduit is maintained at the pressure of the liquid head in the delivery conduit.

Also in accordance with this invention, a method is provided for transferring fluid from a pressurized header to a delivery point remote from the header by: (a) adjusting a control means at the delivery point to indicate the flow requirement thereby generating a signal in response to the flow requirement and transmitting the signal to a valve, operably attached to regulate flow of fluid from the header, (b) operating the valve in response to the signal to regulate flow of fluid from the header through a delivery conduit to the delivery point.

In accordance with another embodiment of the invention valve constructions are provided for regulating flow of fluid from the pressurized header into the delivery conduit. In particular, a mixing valve is provided for mingling relatively hot and cold water to produce a stream controlled to a moderate temperature which is especially suitable for providing tempered water for household uses. More particularly, a mixing valve is provided that uses the pressure of the fluid that is being transferred as the force for operating the opening and closing of the passages through which fluid is passed to the mixing chamber of the mixing valve and, more particularly, means for using alternative sources of power for operating the opening and closing of the passages through which fluid is passed to the mixing chamber are provided within the same mixing valve.

DESCRIPTION OF THE PREFERRED EMBODIMENT

Figure 1:
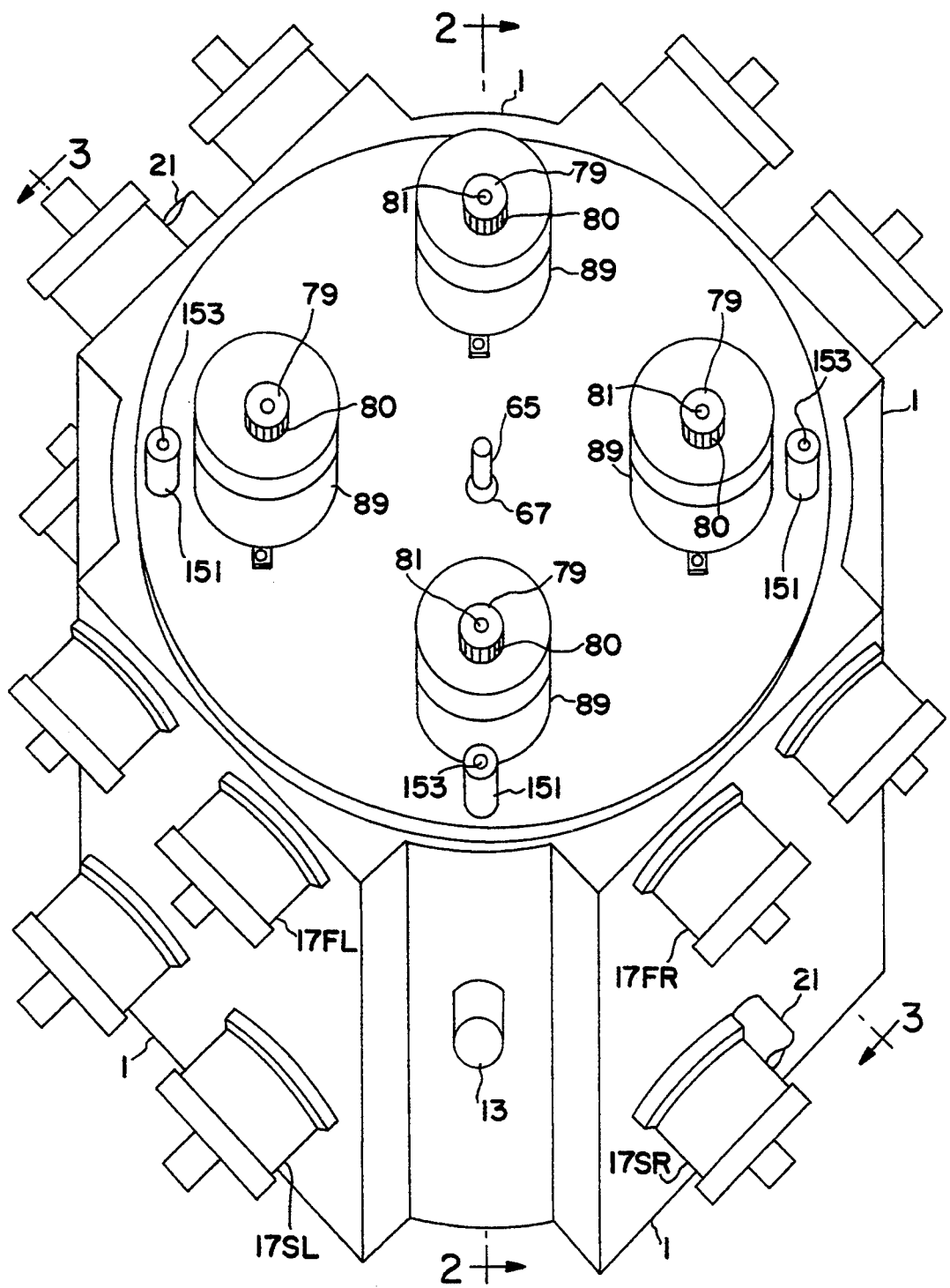
FIG. 1 is a perspective view of the valve housing with the mechanical linkages for operating the mixing valves.

Valve construction is provided by means of which tempered water can be delivered from paired, pressurized hot and cold water headers through a single delivery conduit with means at the delivery point for controlling the flow of water. The mixing valve of the present invention, while useful for mixing any fluids particularly any liquids, is of greatest interest, and will be described in terms of, mixing hot and cold water to provide tempered water for use in a structure containing a multiplicity of individual units.

A mixing valve of this invention is of particular interest for (1) having means built into the valve by which the fluid passage from the inlet chambers into the outlet chamber, preferably operated by the pressure of the fluid in the inlet chambers as set out above, can be alternatively operated by electrical power or by using a combination of auxiliary battery power and pressurized fluid supplied from outside the valve and (2) having means built into the valve by which flow from the two inlet chambers into the outlet chamber is mutually adjusted in relation to the pressure of the fluid from each of the inlet chambers.

The fluid mixing valve of this invention and the method by which it is operated will be explained in conjunction with the drawing. To most quickly understand the construction of this valve, FIG. 1, FIG. 4, FIG. 5 and FIG. 6 of the drawing should be consulted at the same time.

Figure 4:
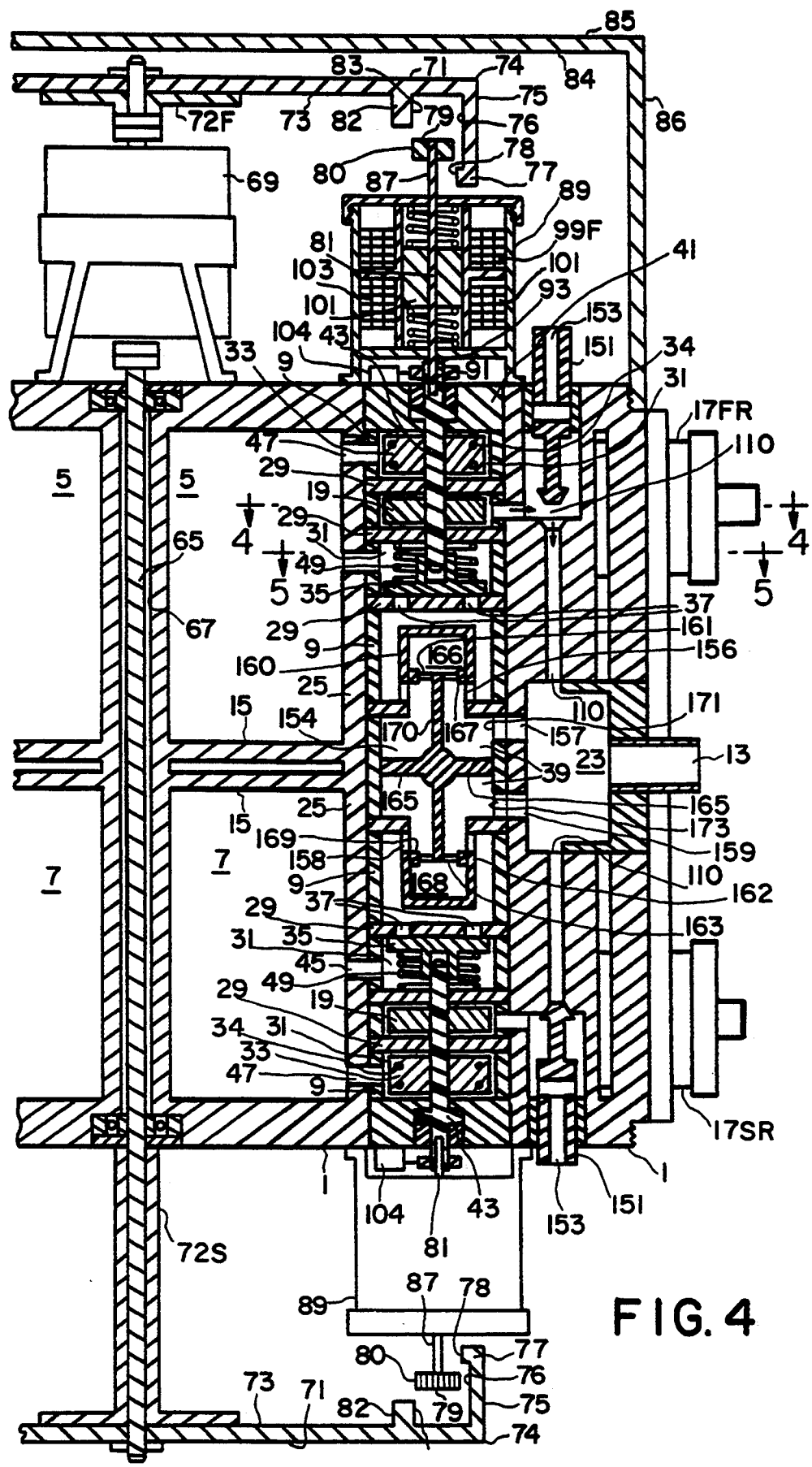
FIG. 4 is a cross sectional view along sight line 2—2 in FIG. 1 of the valve housing with the mechanical linkages for operating the mixing valves using a driven, central shaft.

Referring now to the drawing, in FIG. 1, the outside of the valve housing 1 is in perspective view. FIG. 4 is a cross sectional view along sight line 2-2 of FIG. 1. The combination of FIG. 1 and FIG. 4 is used to illustrate the relationship of the first inlet chamber 5, the second inlet chamber 7, the mechanical linkages of the motor drive and gear system 3 and the enclosed cylindrical unit 9 that contains the controlled mixing portion of the mixing valve.

Figure 5:
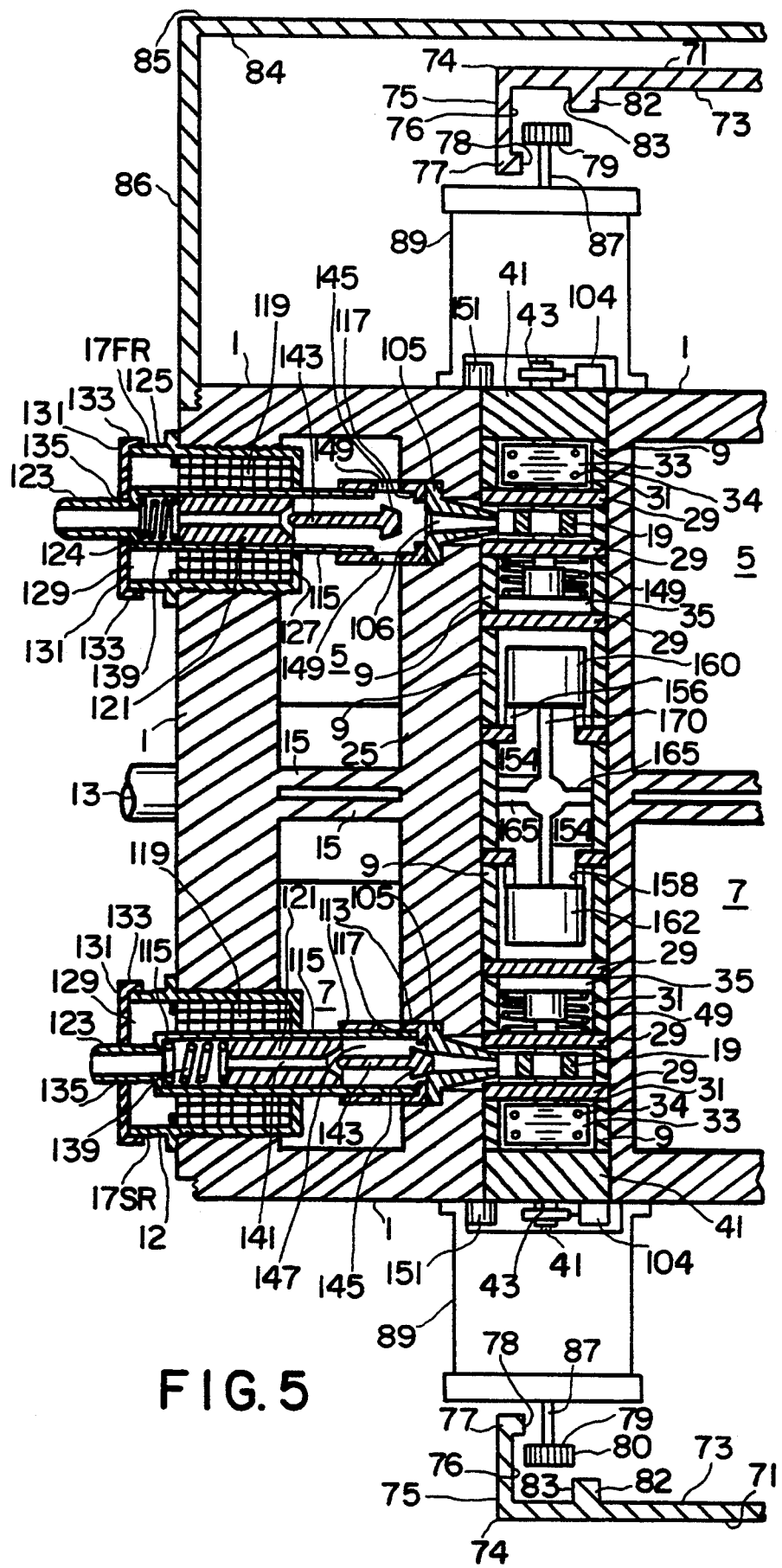
FIG. 5 is a cross sectional view along sight line 3—3 in FIG. 1 of the valve housing with the fluid inlet system for operating the mixing valve rotors and the mechanical linkages for operating the mixing valves using a driven, central shaft.
Figures 6, 7:
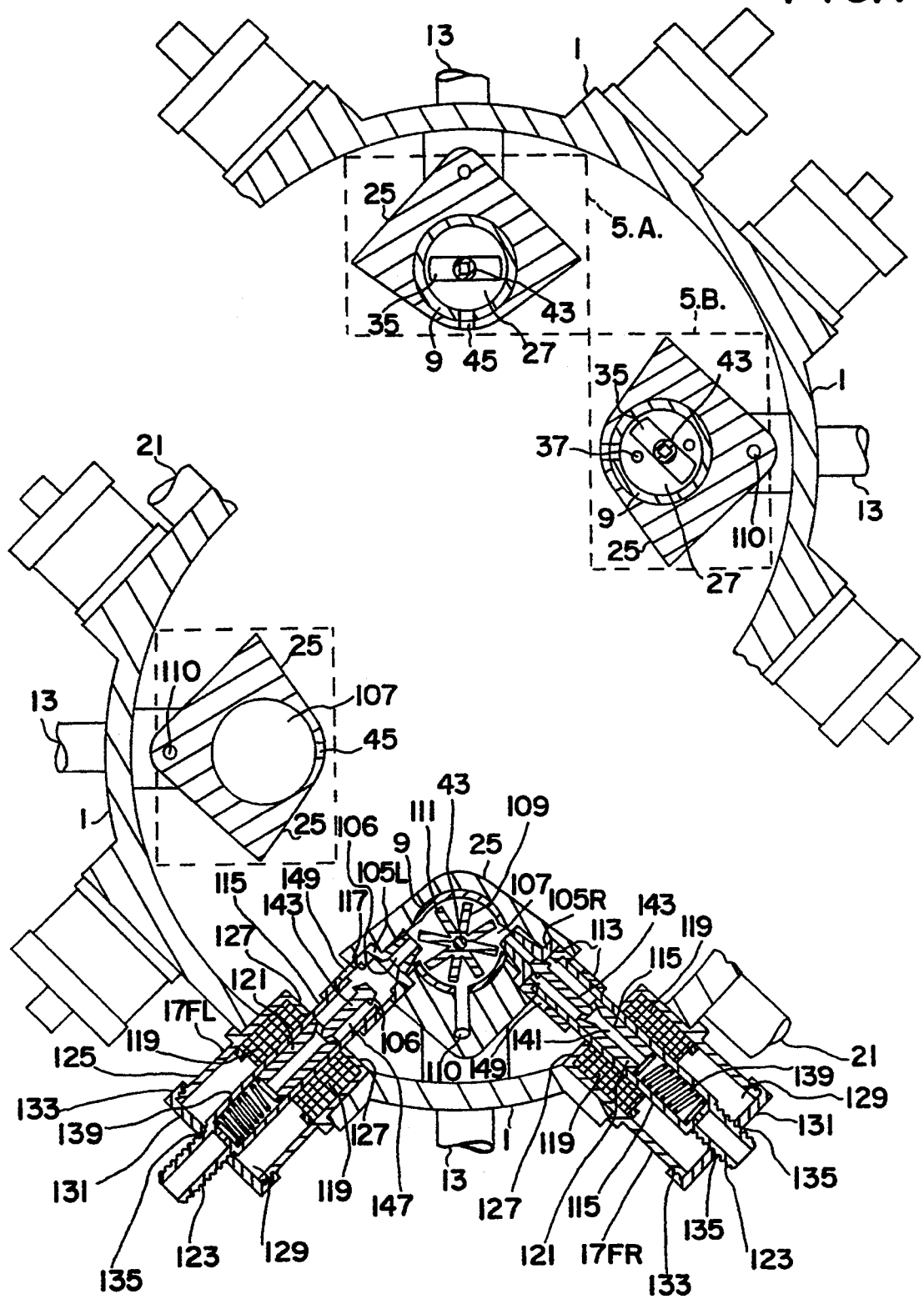
FIG. 6 is a cross sectional view along sight lines 4—4 in FIG. 4 of the valve housing with the fluid inlet system for operating the mixing valve rotors and with Inset A showing the valve body structure.
FIG. 7 is a cross sectional view along sight line 5—5 in FIG. 2 of the valve housing with Insets A and B showing operational views of a closure disc.

FIG. 5 is a cross sectional view along sight line 3—3 of FIG. 1 and FIG. 6 is a cross sectional view along sight line 4—4 of FIG. 4. These figures in conjunction with FIG. 1 show the relationship of the first inlet chamber 5, the second inlet chamber 7, the enclosed cylindrical unit 9 that contains the controlled mixing portion of the mixing valve and the rotor fluid inlet system 11.

Features common to FIGS. 1-6 are the outlet lines 13. The valve housing 1 exemplified in the drawing is designed to provide mixed liquid to four outlet lines with individual control of the flow to each of these outlets. The fluid mixing valve of this invention is essentially a mirror image duplicate on either side of a plane taken through the center of the outlet lines 13. This plane falls within the wall 15 that separates the first inlet chamber 5 from the second inlet chamber 7 (as exemplified in FIGS. 2 and 3). It is within the scope of this invention to separate wall 15 into two walls having an insulation barrier between them or to provide an air space between the walls.

In the following exposition of the invention the same numbers will be used to designate like parts. In some instances an explanation will require distinguishing between like parts used in two different places. When distinguishing between parts serving the first inlet chamber and the second inlet chamber a number and the letter F or S will be used, respectively. When distinguishing parts appearing in FIG. 6 concerning a rotor fluid inlet a number with the letters R and L will be used to designate the right hand and left hand positions on the drawing, respectively.

Figure 2:
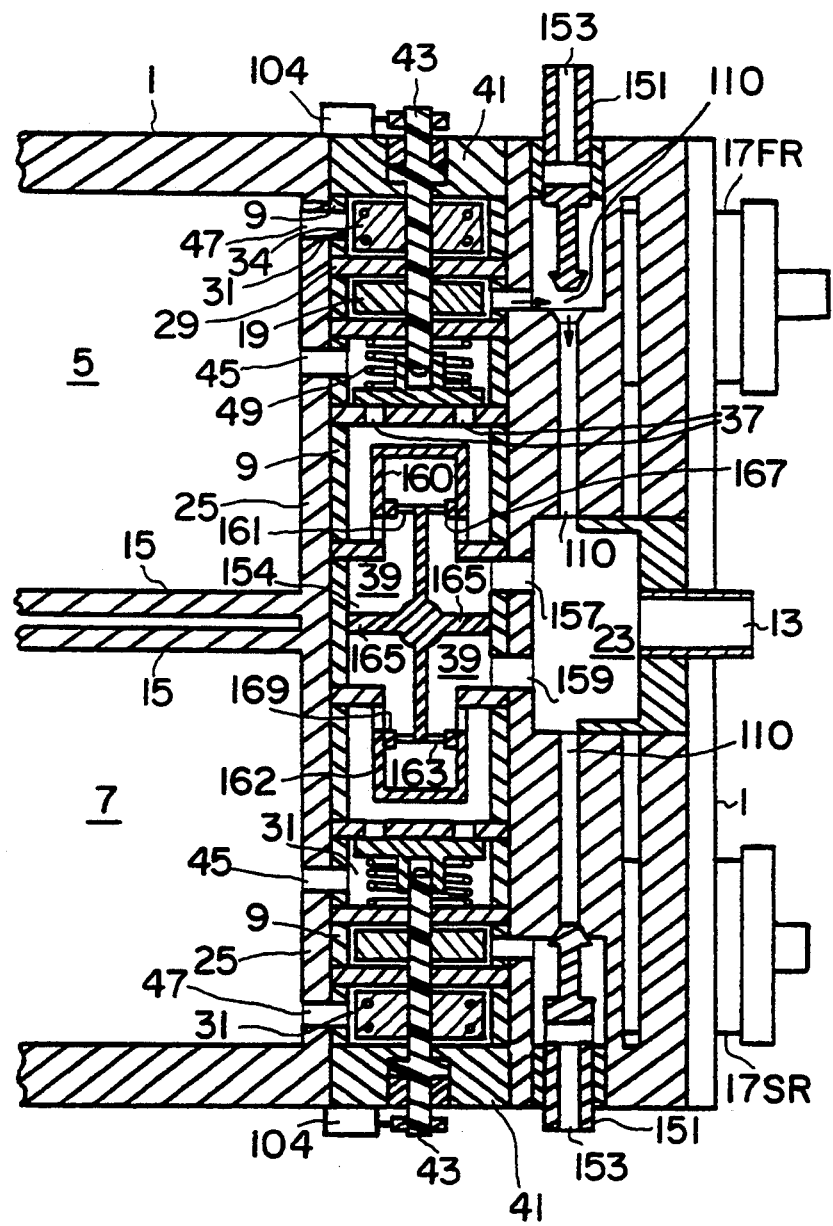
FIG. 2 is a cross sectional view along sight line 2—2 in FIG. 1 of the valve housing with the internal, mechanical linkages for operating the valve using the pressure of the fluid being transferred.
Figure 3:
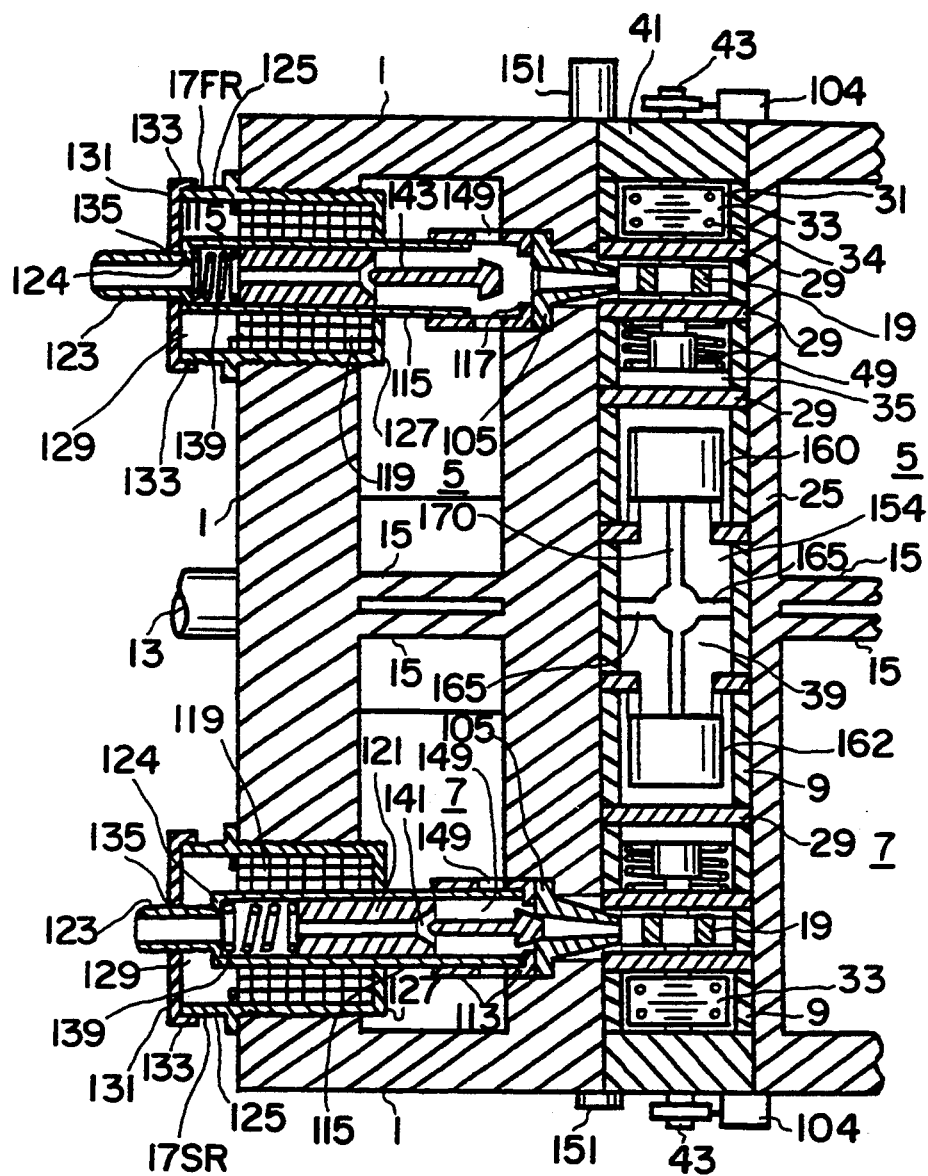
FIG. 3 is a cross sectional view along sight line 3—3 in FIG. 1 of the valve housing with the fluid inlet system for operating the mixing valves rotors.

Another feature common to FIGS. 1–6 is rotor fluid inlet system 17FR for a rotor 19 that serves the first inlet chamber 5. This rotor fluid inlet system 17FR is paired with a second rotor fluid inlet system 17FL which in the alternative supplies fluid to the rotor 17 of the first inlet chamber for turning the rotor in opposite directions. It can be seen in FIG. 1 that a like pair of rotor fluid inlet systems 17SR, 17SL, located directly below the pair serving the first inlet chamber, serve a rotor in the second inlet chamber 7. The relationship of the rotor fluid inlet systems 17FR, 17SR in serving the first inlet chamber and second inlet chamber, respectively, is shown in FIG. 3.

As stated before, the valve housing 1 exemplified in the drawing is designed to provide mixed liquid to four outlet lines 13. Fluid is discharged from a pressurized header (not shown) through an inlet line 21 into the first inlet chamber 5 or the second inlet chamber 7. From this point on, since the same description applies equally to parts and method of operation from either inlet chamber, the descriptions will for clarity refer to one system only. The fluid then is caused to pass through a portion of the enclosed cylindrical unit 9 to the outlet chamber 23 and out the outlet line 13 to a delivery conduit (not shown).

A major, integrated part of the internal structure of the mixing valve is the valve body 25 which has an open cylindrical space 27 passing therethrough from one surface of the valve housing to the opposite surface. An assembled enclosed cylindrical unit 9 can be slid into place, thereby filling the open cylindrical space, and secured in place. The outlet chamber 23 is partially contained in the valve body and extends therefrom to the valve housing 1.

In operation, any problem with the internal components of the cylindrical unit can be overcome by simply replacing the entire cylindrical unit with an assembled spare. The ease with which the entire assembly of the enclosed cylindrical unit can be removed and replaced is a major asset of this valve.

Referring specifically to FIGS. 2 and 4, the enclosed cylindrical unit 9 is composed of axially transverse, partitioning walls 29 which divide the unit into compartments 31 thereby providing separated space for (a) at least one resistance plate 33 having at least one aperture therein, (b) a rotor 19, (c) the passage closure 35, a means for closing the passage 37 for fluid from the inlet chamber and, optionally, (d) a flow/pressure equalizing means chamber 39 which extends an equal distance on each side of wall 15. The partitioning plate that aligns with the valve housing 1, thereby forming part of the valve housing, is preferably as thick as the valve housing wall and is referred to herein as the cover plate 41.

An axially aligned shaft 43 passes through the cover plate 41 and the partitioning walls segregating the rotor 19 and terminates in connection with the passage closure 35. The shaft has connected to it the at least one resistance plate 33, the rotor 19 and the passage closure 35.

In operation, the shaft 43 can be moved by either rotational movement or translational movement to cause the passage closure 35 to uncover the passage 37 to allow flow of fluid from the inlet chamber 5, 7 through an opening 45 in the cylindrical unit wall, through the passage 37 into the flow equalizing chamber 39 and on to the outlet chamber 23.

The compartment enclosing the resistance plate 33 has at least one means of access 47 for fluid from the inlet chamber. A resistance plate connected to a shaft 43 that has rotational movement requires one means of access 47 for fluid from the inlet chamber. A resistance plate connected to a shaft having translational movement requires access 47A, 47B (FIG. 9 and FIG. 10) for fluid from the inlet chamber at both ends of the enclosing compartment.

The function of the resistance plate 33 is to slow the movement of the shaft 43 that causes the passage 37 to be uncovered. To accomplish this end the resistance plate contains at least one aperture therein through which a small amount of the fluid that fills the chamber can pass. The size and number of apertures determines the speed with which the shaft can respond to the force moving the shaft so that the resistance plate is an effective damper to rapid movement of the shaft.

Figure 8:
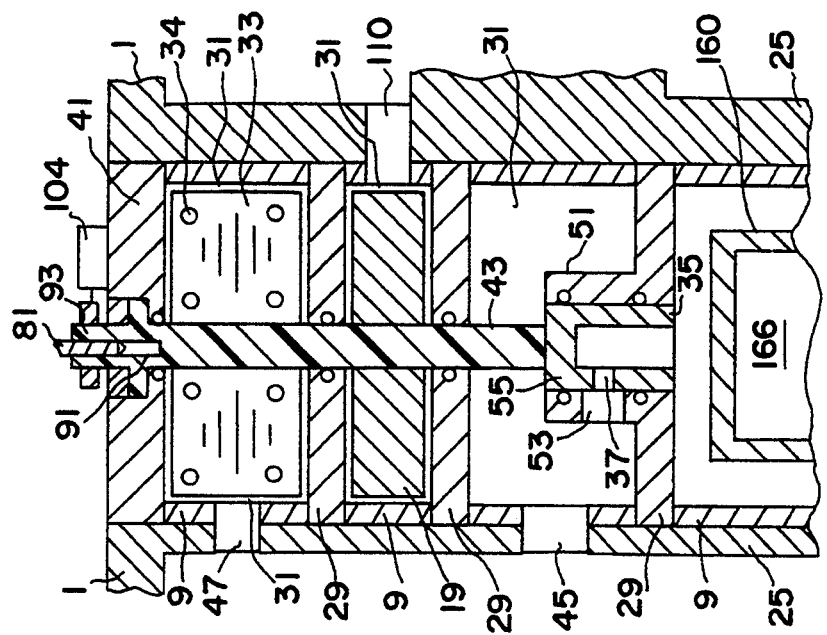
FIG. 8 is a cross sectional view of a rotationally operated cover linkage which is alternative to that shown in FIG. 2.

The function of the passage closure 35 is to provide means by which the passage 37 can be covered or cleared for flow of fluid. According to this invention the passage can be covered by any means operable by rotational or translational movement of the shaft 43. FIGS. 4, 7 and 8 show currently preferred means by which rotational movement of the shaft is used to control the closure of the passage. In FIG. 4 a solid cover plate 35 is attached to the end of shaft 43 and held in fluid tight alignment with the partitioning wall 29 containing the passage 37 by means of a biasing spring 49. Rotation of the shaft rotates the cover plate from a position covering the ports of the passage 37 (FIG. 7, inset 7A) to a position in which the ports are uncovered (FIG. 7, inset 7B).

In FIG. 8, a cylindrical portion 51, coaxial with the shaft, of the partitioning wall 29 contains a fixed aperture 53. The passage closure 35 is a hollow cylindrical body 55 operably attached coaxially to the end of the shaft. The passage 37 is at least one aperture in the wall of the hollow cylindrical body which can be rotated into alignment with the fixed aperture. The aperture in the wall of the hollow cylindrical body can be a single passageway of any cross sectional configuration or a series of passageways of increasing size. Fluid tight alignment is provided as described immediately above.

Figure 9:
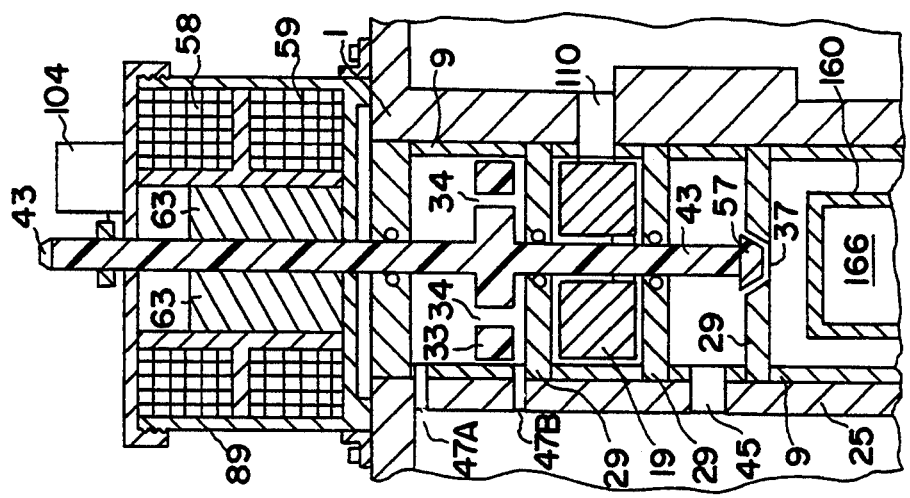
FIG. 9 is a cross sectional view of a translationally operated cover and linkage moved by a solenoid which is alternative to that shown in FIG. 2.
Figure 10:
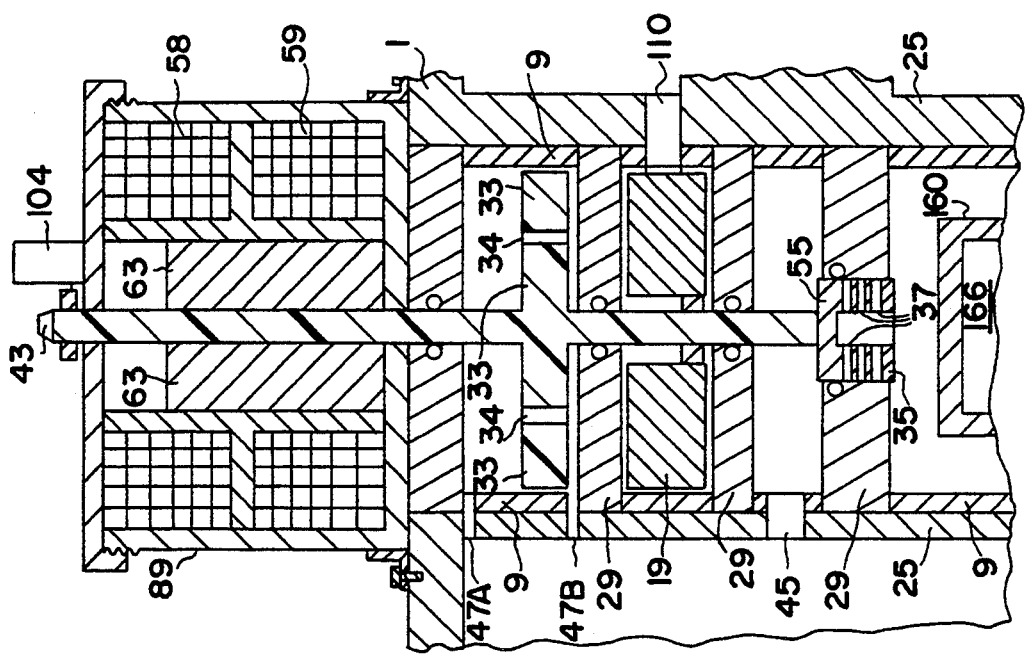
FIG. 10 is a cross sectional view of a translationally operated cover and linkage moved by a solenoid which is alternative to that shown in FIG. 2.

FIGS. 9 and 10 show currently preferred means by which translational movement of the shaft is used to control the closure of the passage. In FIG. 9, a plug-type cover plate 57 is attached to the end of shaft 43 and held in fluid tight alignment with the partitioning wall 29 containing the passage 37. Translational movement of the shaft moves the plug from a position covering the passage 37 to a position in which the port is uncovered.

In FIG. 10, the passage closure 35 is a hollow, cylindrical body 55 attached coaxially to the end of the shaft. The passage 37 is at least one aperture in the wall of the hollow cylindrical body which can be rotated into alignment with the fixed aperture. The aperture in the wall of the hollow cylindrical body can be a single passageway of any cross sectional configuration or a series of passageways of increasing size.

In FIGS. 9 and 10, the passage closure 35 is attached to the end of shaft 43 and is held in fluid tight alignment with the partitioning wall 29 containing the passage 37 by the action of a second passage closure solenoid operator coil 59. The shaft is moved using a first passage closure solenoid operator coil 58, thereby moving the passage closure 35 and uncovering the passage 37.

In operation, the shaft 43 is moved by controlled rotation or translation for the distance required to at least partially uncover the passage 37 to provide flow of fluid through the passage with the movement of the shaft being resisted by the action of fluid within the chamber on the resistance plate 33. The passage is sized so that the operation of totally uncovering the passage requires turning the shaft 45°, ⅛ of a rotation of the shaft, or a translational movement of about 0.125 inch.

The mixing valve of the present invention is provided with means built therein to operate by the force supplied by the fluid being moved, such as a head of water. Referring now to FIG. 6, the operation of the rotor 19 attached to the shaft 43 and the system by which the rotor is turned will be explained.

A fluid mixing valve according to this invention is, therefore, provided in which the system for providing fluid by which the rotor 19 is turned has the following components: (A) a nozzle 105 operably aligned to discharge fluid into the rotor compartment 107 to provide fluid flow near the end of the rotor blades 109 away from the hub 111 of the rotor; (B) a cylindrical, nozzle nipple 113, axially aligned with the nozzle 105, fixedly attached into the structure 25 containing the rotor compartment 107 thereby maintaining the alignment of the nozzle, with the nozzle nipple 113 extending from the structure and providing openings around its circumference for passage of fluid therethrough, with its inside surface engaging the outside surface of a liquid entry closure cylinder 115 seats; (C) a liquid entry closure cylinder 115, axially aligned with the nozzle, its outside surface engaging the inside surface of the nozzle nipple 113 and the inside surface of an auxiliary solenoid coil 119 and its inside surface slidably engaging the outside surface of an auxiliary solenoid core plug 121; (D) a cylindrical, auxiliary solenoid coil 119, axially aligned with the nozzle, its inside surface slidably engaging the outside surface of the liquid entry closure cylinder 115; (E) a cylindrical, auxiliary solenoid housing 125, axially aligned with the nozzle 105, fixedly attached to the auxiliary solenoid coil on a closed end 127 slidably engaging the outside surface of the liquid entry closure cylinder 115 and having a cylindrical, open end 129 outside the valve housing 1, the open end threadedly engaging a closure cap 131; (F) a closure cap 131 having (1) a threaded lip 133 thereon that engages the open end of the solenoid housing and, optionally, (2) an axially centered, threaded opening 135; optionally, (G) a cylindrical, hollow, jack screw portion 123, axially aligned with the nozzle, threadedly engaging the inside surface of the threaded opening of the closure cap and extending therethrough in fixed attachment to the liquid entry closure cylinder 115; (H) a biasing spring 139 slidably engaging the inside surface of the liquid entry closure cylinder 115 and retained between the shoulder 124 of the liquid entry closure cylinder and the solenoid core plug 121; and (I) a solenoid core plug 121, axially aligned with the nozzle, having a hollow, cylindrical portion 141 and extending from the hollow portion an axial shaft 143 terminating in a truncated cone 145, with open communication from the inside of the hollow portion to the annulus 147 between the axial shaft and the inside surface of the liquid entry closure cylinder and with the outside surface of the hollow portion slidably engaging the inside surface of the liquid entry closure cylinder. Optional components set out above are used in operating the system using compressed gas as the force for moving the shaft and will be explained below.

The system for providing fluid to the fluid mixing valve operates as follows to provide the fluid with which the inlet chamber is filled as the operating fluid for the rotor 19: the cylindrical, auxiliary solenoid coil is charged with 12 volt battery power which causes the hollow, cylindrical portion 141 of the core plug 121 to be momentarily drawn back against the biasing spring 139 thereby moving the truncated cone 145 attached to the core plug 121 away from the opening in the nozzle nipple 113 for a time sufficient to allow a spurt of fluid through the nozzle 105. The spurt of fluid enters through the means of ingress 106 of the rotor compartment 107, impinges the rotor blades 109 turning the rotor 19 thereby turning the shaft 43 and flows out of the rotor compartment through the means of egress 110. Since it only takes a ⅛ turn of the shaft 43 to fully open the passage 37 at the end of the shaft it is apparent that the flow of fluid through the nozzle 105L has been minimal.

To close the passage at the end of the shaft exactly the same process takes place, but in this instance the flow is initiated through the nozzle 105R which impinges the rotor blades 109 on the side opposite from the flow that opened the passage 37 thereby moving the rotor 19 and shaft 43 in the opposite direction to close the passage 37.

The turning of the shaft is monitored by a potentiometer 104 which as the shaft turns moves an electrical contact attached thereto along a rheostat changing the electrical potential reading. This reading is delivered to an analog controller to be matched with the controlled setting.

Although the preferred means for moving the shaft has been described above, movement of the shaft can be provided by any appropriate, controlled means. Translational movement can be provided, as stated above, using solenoid operators attached to the shaft with the operators contained in a shaft operator housing 89 attached to the outer surface of the valve housing 1. The impetus for movement to uncover the passage is provided, by standard solenoid operation, by supplying energizing current to the first passage closure solenoid operator coils 58 thereby causing the core 63 to be moved against the restraint provided by the action of fluid within the chamber on the resistance plate 33. The passage is closed by action of a second passage closure solenoid operator coil 59 activated as the first set of coils are deactivated to move the core back to its original position.

Referring now to FIG. 4, preferably the shaft 43 is moved by electrical power imparting rotational energy to shaft 43 using a drive system 3 integrated with the fluid mixing valve so as to be a unitary part thereof. Most preferably the drive system is integrated with the fluid mixing valve so that the first inlet chamber 5 and the second inlet chamber 7 are coaxially adjacent to each other around a drive shaft 65 that operably passes through a shaft housing 67 axially centered in each inlet chamber 5, 7.

The drive shaft 65 has a gear wheel unit 71 attached at both sides of the valve housing 1 positioned by a cylindrical spacer 72 for operable interaction with a pinion gear 79. The drive shaft is driven at one end by a low speed motor 69 attached thereto, preferably situated at one side of the valve housing 1 between the valve housing and the gear wheel unit 71 although it is also within the purview of this invention to place the low speed motor 69 at one side of the valve housing at the end of the drive shaft 65 outside of the gear wheel unit 71. When the low speed motor is placed between the gear wheel unit and the valve housing, the cylindrical spacer 72F associated therewith is considerably reduced in length as compared to a cylindrical spacer 72S filling the entire distance between a gear wheel unit and the valve housing.

The gear wheel unit 71 is made up of (A) a flat, circular portion 73 having at its perimeter 74 (B) an inward-facing cylindrical portion 75 which on its inside surface 76 has a first, lipped gear wheel extension 77 with gear teeth 78 on the inner surface operably engageable with pinion gear teeth 80 on a pinion gear 79 of a movable shaft 81 and (C) a second inward-facing cylindrical gear wheel extension 82 with gear teeth 83 on its outer surface operably engageable with pinion gear teeth 80 on a pinion gear 79 of a movable shaft 81. Since the gear wheel unit 71 is attached at its center to the drive shaft 65 and reacts at its perimeter by the alternative meshing of its gear teeth 78, 83 with the pinion gear teeth 80, the gear wheel and its alignment with the drive shaft 65 and pinion gears 79 can be protected by a housing extension 84 having a circular top 85 that covers the gear wheel flat, circular portion 73 and side pieces 86 fixedly attachable to the valve housing 1 and extending a sufficient distance from the valve housing to allow the gear wheel to move unimpeded within the protective shell of the housing extension 84 while being protected from external mechanical forces.

The pinion gear 79 is operably interactive with the gear wheel extensions 77, 82 of gear wheel 71. The pinion gear is mounted at a first end 87 of a pinion shaft 81 and is coaxial with shaft 43. The pinion gear 79 is sized and is positionable to mesh alternatively with the gear teeth 78, 83 on the gear wheel extensions 77, 82.

The pinion shaft 81 is operably mounted in a spring biased, double solenoid system 89 attached to the valve housing. The pinion shaft at the end opposite the pinion has a cross section 91 that has a configuration for a portion sufficient to allow free translational movement through a similar cross section key 93 of shaft 43 but which causes the pinion shaft to turn the the shaft 43 when the pinion shaft is rotated. Preferably the shaft and key have a square cross section.

The double solenoid system 89 is mounted to position the pinion gear 79 to mesh alternatively with the gear teeth 78, 83 on the gear wheel extensions 77, 82. This alternative meshing permits alternatively moving the shaft 43 clockwise and counterclockwise, In operation, the drive shaft 65 that operably passes through the shaft housing 67 centered in each inlet chamber 5, 7 is driven at one end by a low speed motor 69 thereby moving the gear wheel 71 operably attached at both sides of the valve housing. For the convenience of this explanation the gear wheels will be described as moving clockwise. Both the first, lipped gear wheel extension 77 having gear teeth 78 on the inside surface of the extension and the second inward-facing cylindrical gear wheel extension 82 having gear teeth 83 on the outside portion of the cylinder are, therefore, moving clockwise.

Since the pinion gear 79 can be operated to mesh alternatively with the gear teeth 78, 83 on the gear wheel extensions 77, 82 when the spring biased, double solenoid system 89 attached to the valve housing 1 is moved in opposite directions, electrical current is applied to the first pinion solenoid coil 99 to move the core 101 attached to the pinion shaft 81 thereby moving the square cross section portion 91 of the pinion shaft 81 through the square cross section key 93 of the shaft 43 to position the teeth 80 of the pinion gear 79 against the inside 78 of the cylinder of the first radial extension of the gear wheel 71 thereby causing the pinion gear 79 to move clockwise. The pinion gear turns the pinion shaft 81 and transmits this motion through the square cross section portion 91 of the pinion shaft 81 to turn the shaft 43 clockwise.

Applying electrical current to the second pinion solenoid coil 103 to move the core 101 attached to the pinion shaft 81 thereby moving the pinion shaft freely through the square cross section key 93 of shaft 43 positions the teeth 80 of the pinion gear against the teeth 83 on the outside of the second radial extension 82 of the gear wheel thereby causing the pinion gear 79 to move counterclockwise. The pinion gear 79 turns the pinion shaft 81 and transmits this motion through the square cross section portion 91 of the pinion shaft 81 to turn the shaft 43 counterclockwise.

The double solenoid system 89 is thereby operated to position the pinion 79 to mesh alternatively with the gear teeth 78, 83 on either of the gear wheel extensions 77, 82 so that the shaft 43 can be moved alternatively clockwise and counterclockwise. The shaft movement is registered by potentiometer 104. This reading of the amount of rotational movement is transmitted to a control system. Note that the rotation of the shaft 43 to provide a maximum movement of that shaft is only 45°, ⅛ of a turn of the shaft In the event that there is an outage of electrical power, the mixing valve of the present invention is provided with alternative means built therein to operate with either force supplied by the fluid being moved, such as a head of water, or alternative power of a compressed gas. Referring now to FIG. 4, this is the function of the rotor 19 attached to the shaft 43 and the alternative systems by which the rotor is turned.

A fluid mixing valve according to this invention is, therefore, provided in which the system for providing fluid by which the rotor 19 is turned has the following components: (A) a nozzle 105 operably aligned to discharge fluid into the rotor compartment 107 to provide fluid flow near the end of the rotor blades 109 away from the hub 111 of the rotor; (B) a cylindrical, nozzle nipple 113, axially aligned with the nozzle 105, fixedly attached into the structure 25 containing the rotor compartment 107 thereby maintaining the alignment of the nozzle, the nozzle nipple 113 extending from the structure thereby providing openings around its circumference for passage of fluid therethrough, its inside surface (1) slidably engaging the outside surface of a liquid entry closure cylinder 115 and (2) having a shoulder 117 near the nozzle against which the liquid entry closure cylinder seats; (C) a liquid entry closure cylinder 115, axially aligned with the nozzle, its outside surface slidably engaging the inside surface of the nozzle nipple 113 and the inside surface of an auxiliary solenoid coil 119 and its inside surface (1) slidably engaging the outside surface of an auxiliary solenoid core plug 121 and (2) having a cylindrical, hollow, jack screw portion 123 on the end away from the nozzle nipple, the jack screw portion threaded on its outside surface; (D) a cylindrical, auxiliary solenoid coil 119, axially aligned with the nozzle, its inside surface slidably engaging the outside surface of the liquid entry closure cylinder 115; (E) a cylindrical, auxiliary solenoid housing 125, axially aligned with the nozzle 105, fixedly attached to the auxiliary solenoid coil on a closed end 127 slidably engaging the outside surface of the liquid entry closure cylinder 115 and having a cylindrical, open end 129 outside the valve housing 1, the open end threadedly engaging a closure cap 131; (F) a closure cap 131 having (1) a threaded lip 133 thereon that engages the open end of the solenoid housing and (2) an axially centered, threaded opening 135; (G) a cylindrical, hollow, jack screw portion 123, axially aligned with the nozzle, threadedly engaging the inside surface of the threaded opening of the closure cap and extending therethrough in fixed attachment to the liquid entry closure cylinder 115; (H) a biasing spring 139 slidably engaging the inside surface of the liquid entry closure cylinder 115 and retained between the shoulder 124 of the liquid entry closure cylinder and the solenoid core plug 121; and (I) a solenoid core plug 121, axially aligned with the nozzle, having a hollow, cylindrical portion 141 and extending from the hollow portion an axial shaft 143 terminating in a truncated cone 145, with open communication from the inside of the hollow portion to the annulus 147 between the axial shaft and the inside surface of the liquid entry closure cylinder and with the outside surface of the hollow portion slidably engaging the inside surface of the liquid entry closure cylinder.

The system for providing fluid to the fluid mixing valve operates as follows to provide the fluid with which the inlet chamber is filled as the operating fluid for the rotor 19: the cylindrical, auxiliary solenoid coil is charged with 12 volt battery power which causes the hollow, cylindrical portion 141 of the core plug 121 to be momentarily drawn back against the biasing spring 139 thereby moving the truncated cone 145 attached to the core plug 121 away from the opening in the nozzle nipple 113 for a time sufficient to allow a spurt of fluid through the nozzle 105. The spurt of fluid enters through the means of ingress 106 of the rotor compartment 107, impinges the rotor blades 109 turning the rotor 19 thereby turning the shaft 43 and flows out of the rotor compartment through the means of egress 110. Since it only takes a ⅛ turn of the shaft 43 to fully open the passage 37 at the end of the shaft it is apparent that the flow of fluid through the nozzle 105L has been minimal.

To close the passage at the end of the shaft exactly the same process takes place, but in this instance the flow is initiated through the nozzle 105R which impinges the rotor blades 109 on the side opposite from the flow that opened the passage 37 thereby moving the rotor 19 and shaft 43 in the opposite direction to close the passage 37.

To provide for flow of a compressed gas through this same apparatus the liquid entry closure cylinder 115 must be moved into position to provide a passageway for the gas. This is accomplished by turning the jack screw portion 123 of the liquid entry closure cylinder 115 within the closure cap 131 until it has pushed the liquid entry closure cylinder 115 to a position in which it is seated against the nozzle nipple 113 thereby closing the entry 149 for fluid from the inlet chamber 5. The hollow, jack screw 151 (FIGS. 1 through 5) must also be turned in the valve housing 1 until it is positioned to block flow from the rotor compartment 107 to the outlet chamber 23 and provide an outlet through its hollow portion 153 to the outside of the valve housing 1. Both of these operations are currently disclosed as manual, but can be automatically controlled. Once the path for inlet and outlet of the compressed gas is arranged, the operation of the solenoids 119 for opening and closing the passageway is exactly the same as with the internal fluid.

Figure 11:
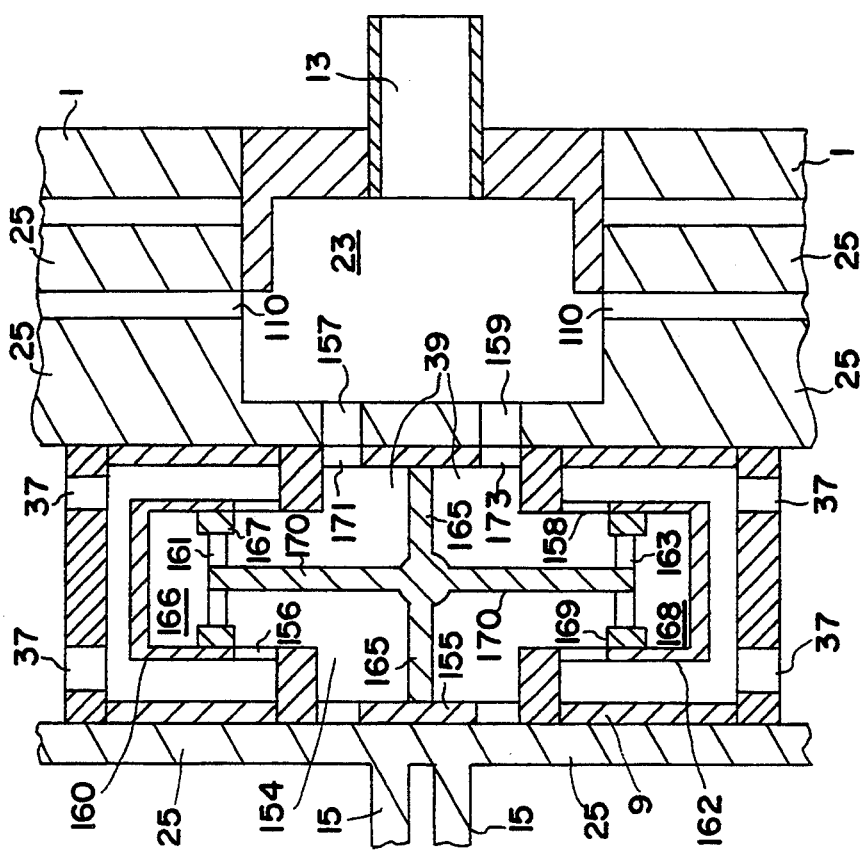
FIG. 11 is a detailed cross sectional view of an equalizer of this invention.

In the disclosure above, the apparatus and the operation of the apparatus have been described, in general, in terms of one half of a mixing valve. For each outlet 13 of mixed fluid the mixing valve housing 1 contains a mirror image pair of devices providing controlled flow of fluid from an inlet chamber 5, 7 through a passage 37 into an outlet chamber 23 where the controlled flows of fluid are combined for delivery through the outlet line 13. The outlet chamber 23 encompasses the area set out in FIGS. 2–4 as the equalizer chamber 39 when the optional flow equalizer 154 is not used, but it is within the scope of this invention to provide the fluid mixing valve of this invention with an internal device that dampens the effect of a sudden reduction in pressure of one of a liquid supply headers. In this embodiment of the invention the means for providing controlled flow from the first inlet chamber 5 and the second inlet chamber 7 are separated from the outlet chamber 23 by a flow equalizing device (see FIG. 11) that is made up of (1) an equalizing chamber 39 operably connected to the passage 37 for providing controlled flow from both the first inlet chamber 5 and the second inlet chamber 7 and having separate outlet openings 157, 159 into the outlet chamber 23 for the first liquid and the second liquid with the equalizing chamber 39 separated into (i) a central, cylindrical chamber 154 and (ii) cylindrical, inlet opening chambers 166, 168 closed at the end nearest the passage 37, spaced away from the partitioning wall containing the passage and surrounded by annular spaces 160, 162 connecting the passage 37 with the inlet opening 156, 158; and (2) an equalizer 154 that has the following characteristics: (a) it has an open discoidal structure 161, 163 at each of its ends; (b) it is divided at its midpoint by a solid discoidal wall 165 that effectively seals one end of the chamber from the other; (c) it has solid cylindrical tube structure 167, 169 (i) of sufficient length at the open discoidal structure at each end of the tube to effectively cover the separate outlet openings 156, 158 from an annular space 160, 162 connecting the passage 37 with the equalizer chamber 39 for the first liquid and the second liquid and (ii) spaced away from the solid wall by supporting wall structure providing open spaces 171, 173 in the cylindrical, equalizer spacer tube 155 wall for a sufficient area to allow free fluid flow from the interior of the cylindrical tube 155 through the separate outlet openings 157,159 of the equalizing chamber 39 into the outlet chamber 23; (d) the solid, discoidal wall 165 is sized in conjunction with the cylindrical equalizing chamber 39 to move freely, in alignment with the interior wall of the cylindrical tube 155 and the outlet openings 157, 159 therein, to maintain flow from the first inlet chamber and the second inlet chamber through separate outlets into the outlet chamber 23 and (e) all of the elements (a)–(d) of the equalizer are axially aligned along a central, equalizer shaft 170 that connects the open discoidal structures 161, 163 and at its midpoint is fixedly connected to the solid, discoidal wall 165.

In operation, the equalizer 154, under normal operating conditions of balanced pressure in the inlet chambers, is maintained in the equalizing chamber 39 with the solid discoidal wall, 165 in the same plane as the wall 15 dividing the first inlet chamber 5 from the second inlet chamber 7. Upon there being an imbalance in the pressure of the liquid in the inlet chambers relative to each other, the higher pressure from one of the inlet chambers causes the equalizer 154 to move toward the end of the equalizing chamber 39 having the lower pressure. This movement causes the solid cylindrical tube structure 167, 169 at the end of the equalizer 154 having the higher pressure to be moved into partial alignment with the outlet opening 156, 158 of the equalizing chamber 39 for that end of the tube to effectively reduce the size of the inlet opening 156, 158 from that end of the equalizing chamber thereby balancing the amount of liquid pushed through a relatively smaller opening from the area of higher pressure against the amount of liquid pushed through a relatively larger opening by the relatively lesser pressure.

As stated before, the equalizer tube 154 is an optional component of the mixing valve of this invention. It can be installed in the equalizing chamber 39 or the chamber can be operated without the tube in which instance, in essence, the equalizing chamber 39 becomes a part of the outlet chamber 23.

In an embodiment in which an outlet line of the mixing valve supplies water to a fixture, such as a toilet, that uses only cold water and does not require a mixing function in the supply valve, the portion of the mixing valve that in usual service would supply hot water to the outlet chamber can be blanked by installing a partitioning wall without a passage for liquid to flow into the outlet chamber at the discharge end of the enclosed cylindrical unit serving the hot water portion of the mixing valve assembly. The portals in the valve housing that would be unused for such a valve can be blind flanged or the valve housing itself can be molded so that these portals are deleted.

A practical design for a valve of the present invention, as set out in the accompanying drawing in FIGS. 1–5, incorporates four sets of mixing components to supply four outlets for delivery of fluid to delivery points remote from the mixing valve. The mixing valve housing can be molded to accommodate from one to any practical number of outlets. The practicality of the number of outlets is determined by the space available and the number of delivery lines it is convenient to connect to a single housing. Although the servicing of a valve housing to which 6–8 outlets are connected can become cumbersome, even a larger number of outlets can be practical for a single housing.

It should be understood that while the valve configuration set out in FIGS. 1–5 is considered, at present, to be the most efficient configuration for a valve of this invention, other configurations using four outlets or a different number of outlets can be made in which the nozzles supplying the alternative source of power to the rotor compartment are set at an angle other than 90d. Using a configuration of any given number of outlet lines in a mixing valve, the angle of the entry of alternative power sources is critical only in supplying two sources acting to turn the rotor blades in opposite directions.

Figure 12:
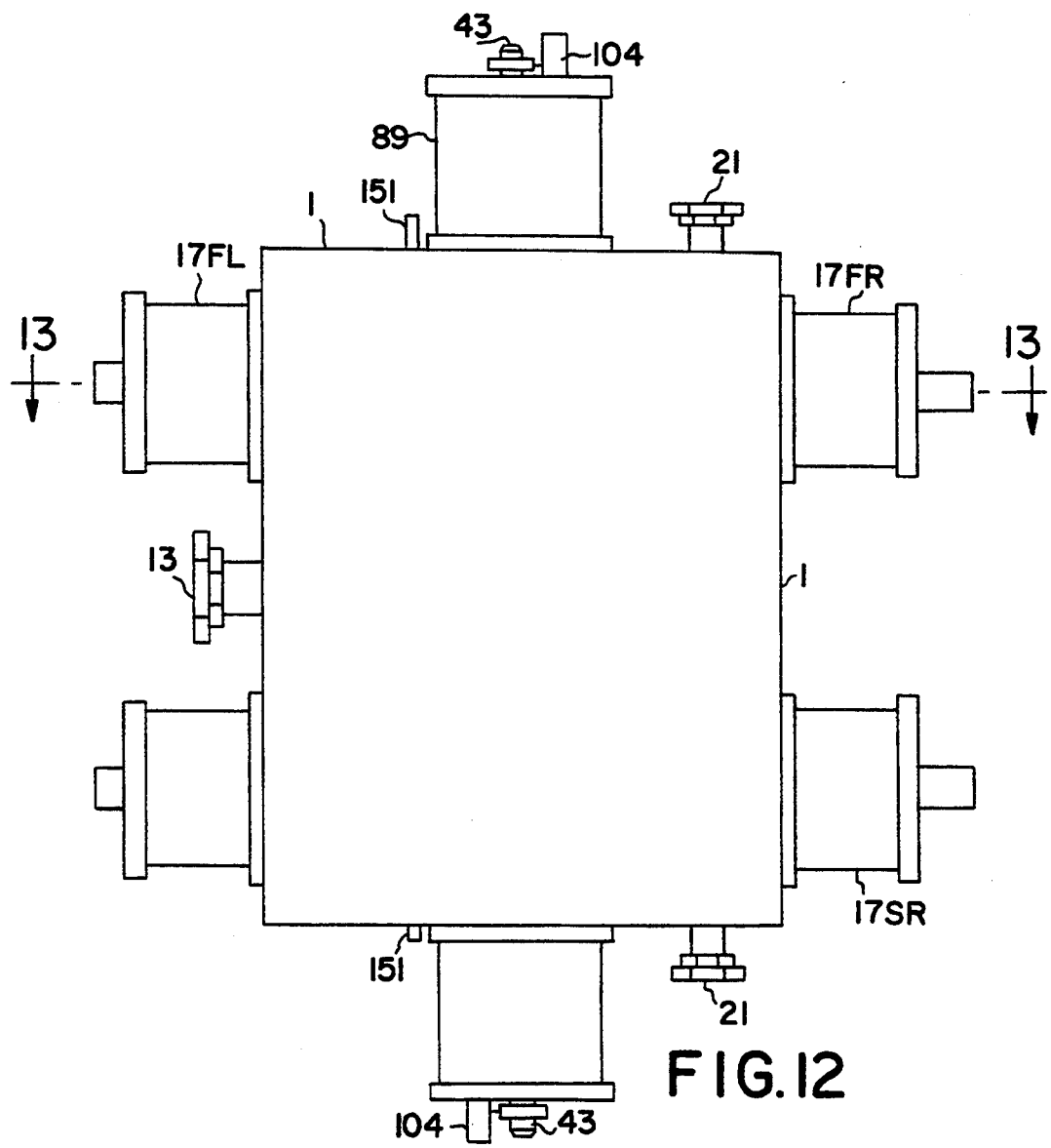
FIG. 12 is a side view of a valve of this invention having a single outlet.
Figure 13:
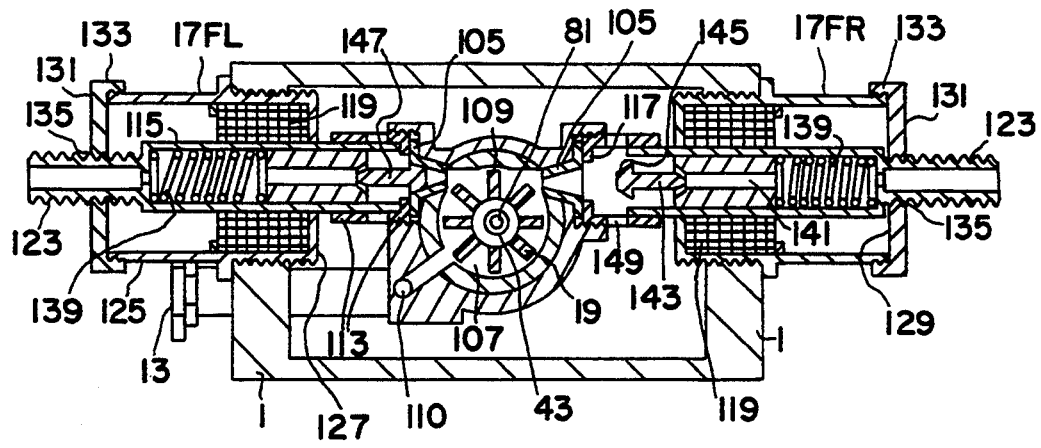
FIG. 13 is a cross sectional view taken along lines 13—13 of FIG. 12 of a valve of this invention having a single outlet.

In FIGS. 12 and 13 a valve using only one outlet is shown to illustrate that the shape of the valve housing and the configuration of the component parts are both adaptable to any particular requirements. The valve shown is of particular interest as illustrating the alternative sources of power for turning the rotor being supplied at an angle of 180 degrees. Various configurations of the single outlet valve are useful in a manifold setting of a multiplicity of individual valves being attached to parallel hot and cold water headers. Using single outlet valves eliminates, however, the advantages of using a single drive shaft for supplying power to control a multiplicity of mixing operations in a single valve housing.

The valves discussed above are essential in the operation of the fluid delivery systems contemplated by this invention. The valves supply the means by which a signal from a point of delivery is permitted to control the mixing of liquids at a remote header site so that delivery lines for the mixed fluids are maintained, when not delivering the mixed fluid, essentially pressure free.

The systems for control of the delivery of the mixed fluids in the present invention use components that are generally known in the art to provide a conceptually unique result. Describing the flow of a mixed hot and cold water stream to a fixture, such as a bathtub, the flow is activated from a control fixture at the delivery point. The control can be as simple as a knob marked to call for any position of a flow of hot water from off to full flow, with a similar knob for the cold water or can be as sophisticated as an integrated flow and thermostat system that sets a prescribed flow of water at a prescribed temperature. Signals are generated that cause activation of the solenoids controlling the movement of the mixing valve shafts to adjust the opening of the passage for each of the hot and cold water to provide the flow called for by the signals.

When a thermostatic control of the temperature is used it has been determined that it is advantageous to measure the temperature of the mixture of tempered water at the outlet chamber of the mixing valve, thereby achieving the desired temperature more rapidly.

The present system is also adapted to provide safety features not usually found in household water supply systems. In one such feature the thermostatic water flow control is supplied with an override which will not permit the hot water valve to open until there is flow in the cold water outlet, until the cold water valve has opened, thereby preventing the accidental discharge of scalding water. Use of this feature will cause the water flow to pass through a tempered water phase even when delivery of very hot water is the ultimate aim.

In operation of this feature, on activation of the control for obtaining water at the delivery point an override mechanism on the hot water control must receive a signal that cold water delivery has been sensed, as by a sensing of cold water flow in the outlet line, before it will permit the hot water valve to either open or receive a signal to cause its opening.

In another safety feature, the overflow lines of bathroom fixtures are equipped with sensors that automatically cause the generation of signals to shut off the flow of both hot and cold water. Fixtures such as toilet bowls and kitchen sinks, which normally do not have overflow lines, can also be equipped with sensors to prevent overflow.

The delivery lines from the mixing valve to the remote point of delivery can be maintained as self draining and therefore empty between deliveries of liquid or can be maintained liquid full, but under only the pressure of the liquid head in the delivery line by adjusting the relative positions of the mixing valve and the delivery point so that one is above the other and the delivery line does not permit the liquid to be trapped. A means for closing the delivery line at the delivery point is not needed in this system thereby saving the cost of such items as faucets, etc. In the event that a closure is deemed desirable at the delivery point, the control system at the delivery point can at the same time as sending its signal to the mixing valve also send a signal to operate a ball valve near the delivery point in an open-closed mode with the ball valve either being fully open or fully closed but with a small vent hole open to prevent there being pressure in the delivery line.

Figure 14:
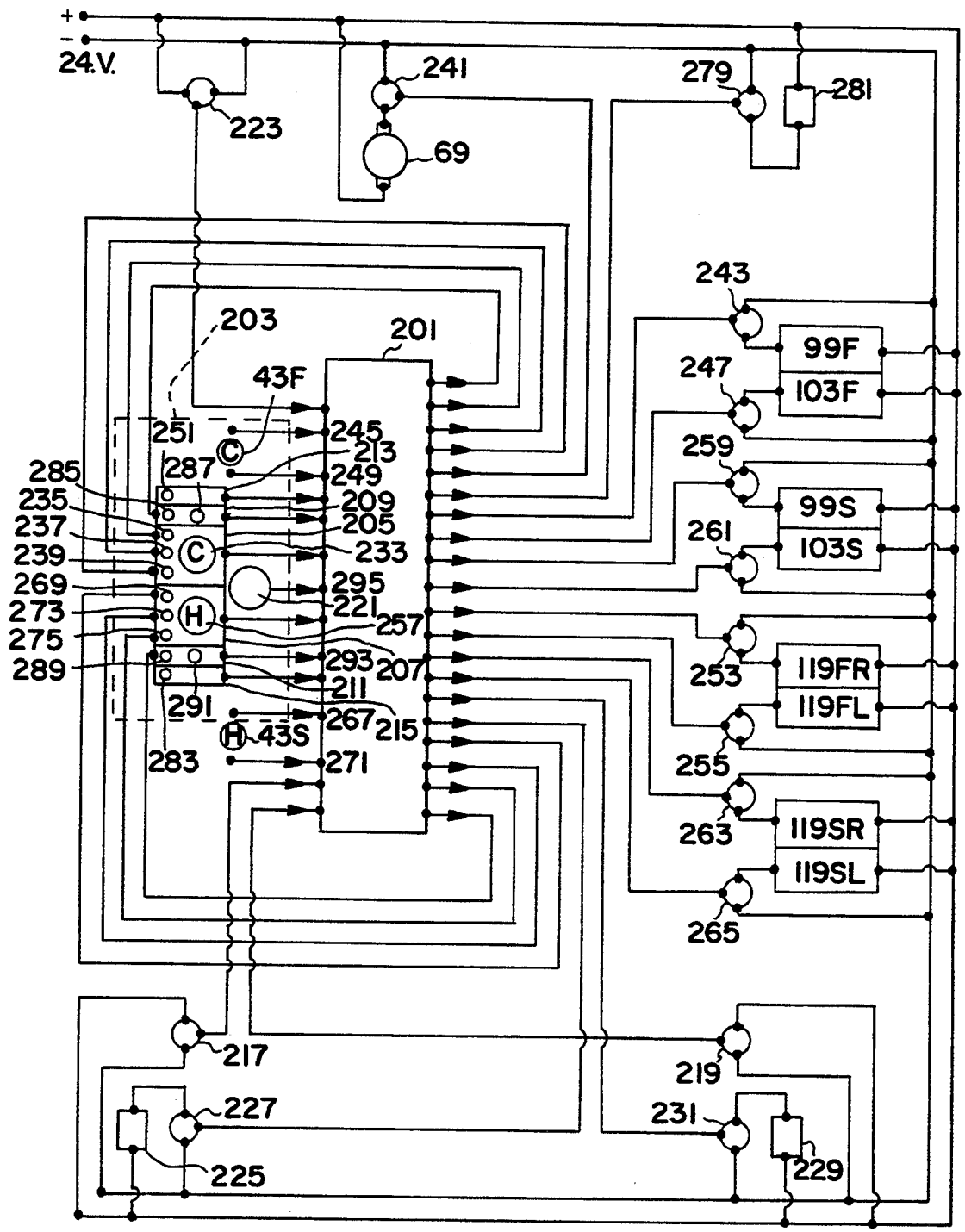
FIG. 14 is a schematic representation of electrical controls and control displays useful in a household tempered water distribution system according to the present invention.

Referring now to FIG. 14, in which electrical controls and control displays useful in a household tempered water distribution system according to the present invention are represented schematically, the functioning of a typical control assembly will be illustrated using the bathtub/shower control unit.

An analog-digital integrated circuit 201 receives input signals from a panel 203 of control switches, interprets the signals and generates signals in response thereto, directing the generated signals to solenoids which respond to the generated signals. The panel 203 is made up of a set of sub-panels containing control and display systems such as cold water control panel 205, hot water control panel 207, intermittent shower control panel 209, shower thermostatic control panel 211, water/gas operation indicator panel 213 and bathtub/shower selector panel 215. A cold water flow sensor 217, a hot water flow sensor 219, a bathtub/shower water delivery temperature sensor 221 and a bathtub overflow sensor 223 also send signals to the analog-digital integrated circuit 201. As will be set out later in this discussion, signals indicating the degree of opening of the passage 37 in both the cold and hot water portions of the mixing valve are also sent to the analog-digital integrated circuit 201.

The cold water flow sensor 217 is installed in the inlet from the cold water header into the mixing valve to provide a signal which indicates that water is flowing past this control point. A similar hot water flow sensor 219 is installed in the inlet from the hot water header into the mixing valve to provide a signal which indicates that water is flowing past this control point.

A solenoid controlled cold water valve 225, installed between the cold water header and the cold water inlet to the mixing valve receives current on the closing of cold water activating switch 227. Similarly, a solenoid controlled hot water valve 229, installed between the hot water header and the hot water inlet to the mixing valve receives current on the closing of hot water activating switch 231. The control program for switch 231 will not close the switch unless flow is sensed by cold water flow sensor 217. This prevents the possibility of the inadvertent delivery of very hot water because no cold water is available. Under conditions in which there is no call for water delivery the switches 227, 231 re-main open so that there is no pressure of water from the main headers anywhere in the delivery system including the mixing valve.

The cold water control panel 205 typically contains a control knob 233 and a set of three LEDs: green 235 to indicate that the passage 37 in the cold water portion of the mixing valve is open; red 237 to indicate that the passage 37 in the cold water portion of the mixing valve is closed; and yellow 239 to indicate that no flow is sensed from the main header into the mixing valve.

The control knob 233 is operated by turning clockwise to the desired degree of open. Turning the knob clockwise acts to increase a potentiometer setting supplying an analog signal to the analog-digital integrated circuit. This (1) causes the low speed motor switch 241 to activate the low speed motor 69 that turns the motor shaft 65 and (2) operates the switch 243 that activates the solenoid 99F to operate pinion shaft 81 to begin the sequence that opens the passage 37 in the cold water portion of the mixing valve. The movement of the shaft 43F provides an analog signal at terminal 245 indicating the degree to which the passage is open. When this analog signal indicates fully open, unit 201 generates a signal activating the green LED 233 to close the passage 37 the knob 233 is turned counterclockwise which deactivates switch 243 and operates the switch 247 that activates the solenoid 103F to operate pinion shaft 81 to begin the sequence that closes the passage 37 in the cold water portion of the mixing valve. The movement of the shaft 43F provides an analog signal at terminal 249 indicating the degree to which the passage is closed. When this analog signal indicates fully closed, unit 201 generates a signal activating the red LED 237.

To operate the mixing valve on water or air power a manual switch, in the area in which the mixing valve is located, is operated which (1) turns on the green LED 251; (2) causes unit 201 to signal switch 253 to operate solenoid 119FR instead of sending the signal to switch 243 for opening the passage 37 and (3) causes unit 201 to signal switch 255 to operate solenoid 119FL instead of sending the signal to switch 247 for closing the passage 37.

The hot water panel is operated in the same manner as the cold water panel using the hot water control knob 257 to activate the switch 259 to operate solenoid 99S to open the passage 37 and to activate switch 261 to operate solenoid 103S to close the passage 37 when normal electric power is the driving force of the mixing valve. The hot water control knob 257 activates the switch 263 to operate solenoid 119SR to open the passage 37 and activates switch 265 to operate solenoid 119SL to close the passage 37 when water or air power is the driving force of the mixing valve.

The movement of the shaft 43S provides an analog signal at terminal 267 indicating the degree to which the passage is open. When this analog signal indicates fully open, unit 201 generates a signal activating the green LED 269. The movement of the shaft 43S provides an analog signal at terminal 271 indicating the degree to which the passage is closed. When this analog signal indicates fully closed, unit 201 generates a signal activating the red LED 273. Activation of the yellow LED 275 indicates no flow from the hot water main header into the mixing valve.

The intermittent shower panel 209 has a knob switch 287 which in the "in" position provides a signal to unit 201 which generates a signal to control switch 279 to direct the flow of water through valve 281 from the bathtub to the shower and generates a signal to activate the LED 285. When the switch 287 is in the "out" position the valve 281 is positioned to direct water to the bathtub and LED 283 is activated.

The intermittent shower control panel 209 contains an LED 285 and a control knob 287. Control knob 287 is used to vary the setting of timer from zero to 5 minutes which is sent as a signal to unit 201. Positioning the knob above zero setting causes the LED 283 to be activated and the setting acts as a timer supplying an analog signal to unit 201 which converts the signal to a digital signal and compares the signal to a set time value in unit 201. As the timer counts down from the original time setting the hot water is shut off at a preset interval so that there is an alternating flow of cold and tempered water. As an example, the time interval at which flow of hot water is set to alternate between off and on can be selectively preset in unit 201 to be 15 seconds. The control knob 287 can be set to select a time of five minutes. During that five minutes there would be alternate flows of 15 seconds of cold water and 15 seconds of tempered water.

The shower thermostatic control panel 211 contains an LED 289 and a control knob 291. When the control knob 291 is adjusted from the "off" setting the LED 289 is activated. The adjustment of control knob sets the thermostatic control temperature and sends an analog signal to unit 201. The sensor 221 in the mixing valve outlet measures the temperature of the water in the outlet and sends a signal representing this temperature to unit 201. The computer compares the temperature desired according to the setting of control knob 291 to the actual temperature of water leaving the mixing valve as determined by sensor 221. If the actual temperature is less than called for by the control setting, switch 259, 263 is activated to power up the coil of solenoid valve 99S, 119SR admitting more hot water through the passage 37F to increase the temperature of the tempered water leaving the mixing valve. If the actual temperature is more than called for by the control setting, switch 261, 265 is activated to power up the coil of solenoid valve 103S, 119SL admitting less hot water through the passage 37F to decrease the temperature of the tempered water leaving the mixing valve.

The use of electric power in the form of 24 volt and 5 volt electrical systems is set out above as the supply of power for various elements of this invention. Such systems are well known and easily supplied by the use of transformers.

While the invention has been described in detail for the purpose of illustration, it is not to be construed as limited thereby but is intended to cover all changes and modifications within the spirit and scope thereof.

That which is claimed is:

1. A fluid mixing valve comprising:
   (A) a valve housing containing a first inlet chamber, a second inlet chamber and a multiplicity of outlet chambers mutually isolated from each other,
   (B) the first inlet chamber operably connected to a pressurized source of a first fluid,
   (C) the second inlet chamber operably connected to a pressurized source of a second fluid,
   (D) each outlet chamber operably connected to a discharge line,
   (E) individual means for providing a controlled flow of fluid into each outlet chamber from the first inlet chamber,
   (F) individual means for providing a controlled flow of fluid into each outlet chamber from the second inlet chamber providing a mixture of the first fluid and the second fluid through each outlet chamber to a discharge line, each of said means for providing a controlled flow of fluid comprising:
   (a) at least one aperture in a wall enclosing an outlet chamber to permit fluid to flow to an outlet chamber from an inlet chamber,
   (b) means for closing each at least one aperture adapted to move to positions that alternatively cover and uncover the at least one aperture,
   (c) a shaft connecting the means closing each passage with a means for imparting movement to the shaft, and
   (d) a means for independently moving each shaft, transmitting rotational movement to said shaft from a rotor attached to said shaft said rotor adapted to be turned by fluid movement.

2. A fluid mixing valve of claim 1 wherein at least one resistance plate having at least one aperture therein is attached to the shaft to provide resistance to the rotation of the shaft.

3. A fluid mixing valve of claim 2 wherein the shaft, the rotor and the means for closing the passage are axially aligned in an enclosed cylindrical unit wherein axially transverse, partitioning walls provide separate compartments for the rotor, the at least one resistance plate and the means closing the passage; the shaft passes through the partitioning walls; the compartment containing the rotor provides upstream means of ingress and downstream means of egress for a drive fluid chosen from fluid in an inlet chamber and fluid of external source and the compartment containing the at least one resistance plate provides access means for the fluid in an inlet chamber.

4. A fluid mixing valve of claim 3 wherein the shaft, the rotor and the means for closing the passage are axially aligned in an enclosed cylindrical unit wherein axially transverse, partitioning walls provide separate compartments for the rotor, the at least one resistance plate and the means closing the passage; the shaft passes through the partitioning walls; the compartment containing the rotor provides upstream means of ingress and downstream means of egress for a drive fluid chosen from fluid in an inlet chamber and fluid of external source; the compartment containing the at least one resistance plate provides access means for the fluid in an inlet chamber and the enclosed cylindrical unit is, optionally, axially aligned with a flow equalizing device.

5. A drive and gear system integrated with a fluid mixing valve of claim 1 wherein the first inlet chamber and the second inlet chamber are coaxially adjacent to each other around a drive shaft that operably passes through a shaft housing centered in each inlet chamber, the shaft driven at one end by a low speed motor attached thereto and having operably attached at both sides of the valve housing
   (A) a gear wheel comprising a flat, circular portion having (1) at its perimeter a first inward-facing cylindrical portion with gear teeth on the inner surface of the cylinder and (2) a second inward-facing cylindrical portion with gear teeth on the outer surface of the cylinder the first and second cylindrical portions spaced to be alternatively meshed with
   (B) a pinion gear operably interactive with the gear wheel, the pinion gear mounted on a first end of a pinion gear shaft with the second end of the pinion gear shaft keyed into a rotor shaft of the mixing pump to provide free translational movement of the pinion gear shaft within the rotor shaft and locked rotational movement, the pinion shaft operably mounted in a spring biased, double solenoid system attached to the valve housing, the double solenoid system mounted to position the pinion gear to mesh alternatively with the gear teeth on the gear wheel extensions, thereby alternatively moving the rotor shaft clockwise and counterclockwise.

6. A fluid valve of claim 1 wherein the system for providing fluid by which the rotor is turned comprises:
   (A) a nozzle operably aligned to discharge fluid into the rotor compartment to provide fluid flow near the end of the rotor blades away from the hub of the rotor;
   (B) a cylindrical, nozzle nipple, axially aligned with the nozzle, fixedly attached into the structure containing the rotor compartment thereby maintaining the alignment of the nozzle, the nipple extending from the structure thereby providing openings around its circumference for passage of fluid therethrough, its inside surface engaging the outside surface of a liquid entry closure cylinder;
   (C) a liquid entry closure cylinder, axially aligned with the nozzle, its outside surface engaging the inside surface of the nozzle nipple and the inside surface of an auxiliary solenoid coil and its inside surface engaging the outside surface of an auxiliary solenoid core plug;
   (D) a cylindrical, auxiliary solenoid coil, axially aligned with the nozzle, its inside surface engaging the outside surface of the liquid entry closure cylinder;
   (E) a cylindrical, auxiliary solenoid housing, axially aligned with the nozzle, fixedly attached to the auxiliary solenoid coil on a closed end engaging the outside surface of the liquid entry closure cylinder and having a cylindrical, open end outside the valve housing, the open end threadedly engaging a closure cap;
   (F) a closure cap having (1) a threaded lip thereon that engages the open end of the solenoid housing;
   (G) a biasing spring slidably engaging the inside surface of the liquid entry closure cylinder and retained between the shoulder of the liquid entry closure cylinder and the solenoid core plug and (H) a solenoid core plug, axially aligned with the nozzle, having a hollow, cylindrical portion and extending from the hollow portion as an axial shaft terminating in a truncated cone, the outside surface of the hollow portion slidably engaging the inside surface of the liquid entry closure cylinder.

7. A method of mixing fluid according to claim 6 wherein pressurized fluid from an inlet chamber is used to operate a rotor on the shaft controlling flow of fluid from an inlet chamber into the at least one outlet chamber.

8. A fluid mixing valve of claim 1 wherein a means for providing controlled flow from the first inlet chamber and the second inlet chamber are separated from an outlet chamber by (G) a flow equalizing device comprising:
   (1) a cylindrical equalizing chamber having separate outlet openings into the outlet chamber for the first fluid and the second fluid and operably connected to the means for providing controlled flow from the first inlet chamber and the second inlet chamber by cylindrical, inlet opening chambers (a) closed at the ends nearest the outlet from the means for providing controlled flow, (b) spaced away from a partitioning wall containing the means for providing controlled flow, (c) surrounded by an annular space and (d) having openings from the annular space into the inlet opening chamber and
   (2) an equalizer: (a) having an open discoidal structure at each of its ends; (b) divided at its midpoint by a solid discoidal wall that effectively seals one end of the chamber from the other; (c) having solid cylindrical tube structure (i) of sufficient length at the open discoidal structure at each end of the tube to effectively cover the separate outlet openings from the annular space and (ii) spaced away from the solid wall by supporting wall structure providing open spaces to allow free fluid flow from the interior of the cylindrical tube through the separate outlet openings of the equalizing chamber into the outlet chamber; (d) the solid, discoidal wall is sized in conjunction with the cylindrical equalizing chamber to move freely, in alignment with the outlet openings to maintain flow from the first inlet chamber and the second inlet chamber through separate outlets into the outlet chamber and (e) all of the elements (a)-(d) of the equalizer are axially aligned along a central, equalizer shaft that connects the open discoidal structures and at its midpoint is fixedly connected to the solid, discoidal wall.

9. An apparatus for providing mixed fluids at a delivery point removed from the location at which the fluids are mixed comprising controlling the mixing function of a valve of claim 1 from a point of delivery removed from the location of the valve.

10. An apparatus for providing mixed fluids at a delivery point removed from the location at which the fluids are mixed comprising controlling the mixing functions of a multiplicity of valves of claim 1 from a point of delivery removed from the location of the valve.

11. A fluid mixing valve of claim 1 in which means for providing a controlled flow of fluid further comprise, as alternative means for independently moving each shaft, a means transmitting rotational movement to said shaft from a motor operably connected with the shaft in addition to said means transmitting rotational movement to said shaft from a rotor adapted to be turned by fluid movement.

12. A fluid mixing valve of claim 11 wherein at least one resistance plate having at least one aperture therein is attached to the shaft to provide resistance to the rotation of the shaft.

13. A fluid mixing valve of claim 12 wherein the shaft, the rotor and the means for closing the passage are axially aligned in an enclosed cylindrical unit wherein axially transverse, partitioning walls provide separate compartments for the rotor, the at least one resistance plate and the means closing the passage; the shaft passes through the partitioning walls; the compartment containing the rotor provides upstream means of ingress and downstream means of egress for a drive fluid chosen from fluid in an inlet chamber and fluid of external source and the compartment containing the at least one resistance plate provides access means for the fluid in an inlet chamber.

14. A drive and gear system integrated with a fluid mixing valve of claim 10 wherein the first inlet chamber and the second inlet chamber are coaxially adjacent to each other around a drive shaft that operably passes through a shaft housing centered in each inlet chamber, the shaft driven at one end by a low speed motor attached thereto and having operably attached at both sides of the valve housing (A) a gear wheel comprising a flat, circular portion having (1) at its perimeter a first inward-facing cylindrical portion with gear teeth on the inner surface of the cylinder and (2) a second inward-facing cylindrical portion with gear teeth on the outer surface of the cylinder the first and second cylindrical portions spaced to be alternatively meshed with (B) a pinion gear operably interactive with the gear wheel, the pinion gear mounted on a first end of a pinion gear shaft with the second end of the pinion gear shaft keyed into a rotor shaft of the mixing pump to provide free translational movement of the pinion gear shaft within the rotor shaft and locked rotational movement, the pinion shaft operably mounted in a spring biased, double solenoid system attached to the valve housing, the double solenoid system mounted to position the pinion gear to mesh alternatively with the gear teeth on the gear wheel extensions, thereby alternatively moving the rotor shaft clockwise and counterclockwise.

15. A fluid valve of claim 11 wherein the system for providing fluid by which the rotor is turned comprises:

(A) a nozzle operably aligned to discharge fluid into the rotor compartment to provide fluid flow near the end of the rotor blades away from the hub of the rotor;

(B) a cylindrical, nozzle nipple, axially aligned with the nozzle, fixedly attached into the structure containing the rotor compartment thereby maintaining the alignment of the nozzle, the nipple extending from the structure thereby providing openings around its circumference for passage of fluid therethrough, its inside surface (1) slidably engaging the outside surface of a liquid entry closure cylinder and (2) having a shoulder near the nozzle against which the liquid entry closure cylinder seats;

(C) a liquid entry closure cylinder, axially aligned with the nozzle, its outside surface slidably engaging the inside surface of the nozzle nipple and the inside surface of an auxiliary solenoid coil and its inside surface (1) slidably engaging the outside surface of an auxiliary solenoid core plug and (2) having a shoulder on the end away from the nozzle nipple, the shoulder threaded on its internal surface;

(D) a cylindrical, auxiliary solenoid coil, axially aligned with the nozzle, its inside surface slidably engaging the outside surface of the liquid entry closure cylinder;

(E) a cylindrical, auxiliary solenoid housing, axially aligned with the nozzle, fixedly attached to the auxiliary solenoid coil on a closed end slidably engaging the outside surface of the liquid entry closure cylinder and having a cylindrical, open end outside the valve housing, the open end threadedly engaging a closure cap;

(F) a closure cap having (1) a threaded lip thereon that engages the open end of the solenoid housing and (2) an axially centered, jack nipple;

(G) a cylindrical, hollow, retaining nipple, the outside surface thereof threadedly engaging the internal surface of the shoulder of the liquid entry closure cylinder (H) a cylindrical, hollow, jack screw, axially aligned with the nozzle, threadedly engaging the inside surface of the jack nipple and extending therethrough to engage the shoulder of the liquid entry closure cylinder;

(I) a biasing spring slidably engaging the inside surface of the liquid entry closure cylinder and retained between the shoulder of the liquid entry closure cylinder and the solenoid core plug and (J) a solenoid core plug, axially aligned with the nozzle, having a hollow, cylindrical portion and extending from the hollow portion as an axial shaft terminating in a truncated cone, the outside surface of the hollow portion slidably engaging the the inside surface of the liquid entry closure cylinder.

16. An apparatus of claim 15 converted to operate using compressed gas wherein the cylindrical, hollow, jack screw, axially aligned with the nozzle, threadedly engaging the inside surface of the jack nipple and extending therethrough to engage the shoulder of the liquid entry closure cylinder is screwed into position to seat the liquid entry closure cylinder against the shoulder near the nozzle thereby closing the liquid entry to the nozzle.

17. A fluid mixing valve of claim 1 in which means for providing a controlled flow of fluid further comprise, as alternative means for independently moving each shaft, a means transmitting translational movement to said shaft from a solenoid operably connected with the shaft in addition to said means transmitting rotational movement to said shaft from a rotor adapted to be turned by fluid movement.

18. A fluid mixing valve of claim 17 wherein at least one resistance plate having at least one aperture therein is attached to the shaft to provide resistance to the rotation of the shaft.

19. A fluid mixing valve of claim 18 wherein the shaft, the rotor and the means for closing the passage are axially aligned in an enclosed cylindrical unit wherein axially transverse, partitioning walls provide separate compartments for the rotor, the at least one resistance plate and the means closing the passage; the shaft passes through the partitioning walls; the compartment containing the rotor provides upstream means of ingress and downstream means of egress for a drive fluid chosen from fluid in an inlet chamber and fluid of external source and the compartment containing the at least one resistance plate provides access means for the fluid in an inlet chamber.

20. A fluid mixing valve of claim 19 wherein the shaft, the rotor and the means for closing the passage are axially aligned in an enclosed cylindrical unit wherein axially transverse, partitioning walls provide separate compartments for the rotor, the resistance plate and the means closing the passage; the shaft passes through the partitioning walls; the compartment containing the rotor provides upstream means of ingress and downstream means of egress for a drive fluid chosen from fluid in an inlet chamber and fluid of external source; the compartment containing the resistance plate provides access means for the fluid in an inlet chamber and the enclosed cylindrical unit is, optionally, axially aligned with a flow equalizing device.

21. A fluid mixing valve of claim 17 wherein a resistance plate having at least one aperture therein is attached to the shaft to provide resistance to the translational movement of the shaft.

22. A fluid mixing valve of claim 21 wherein the shaft, the rotor and the means for closing the passage are axially aligned in an enclosed cylindrical unit wherein axially transverse, partitioning walls provide separate compartments for the rotor, the at least one resistance plate and the means closing the passage; the shaft passes through the partitioning walls; the compartment containing the rotor provides upstream means of ingress and downstream means of egress for a drive fluid chosen from fluid in an inlet chamber and fluid of external source; the compartment containing the resistance plate provides access means on both sides of the resistance plate for the fluid in an inlet chamber.

23. A fluid mixing valve of claim 22 wherein the enclosed cylindrical unit is axially aligned with a flow equalizing device.

24. A method of mixing fluid in a valve comprising:
(A) passing a pressurized first fluid into a first inlet chamber and passing a pressurized second fluid into a second inlet chamber of a valve housing containing a first inlet chamber, a second inlet chamber and a multiplicity of outlet chambers mutually isolated from each other,
(B) providing a controlled flow of fluid from the first inlet chamber into each outlet chamber,
(C) providing a controlled flow of fluid from the second inlet chamber into each outlet chamber thereby providing a mixture of the first fluid and the second fluid to a discharge line through each outlet chamber and
(D) providing pressurized fluid from an inlet chamber to operate a means for controlling flow of fluid from an inlet chamber into the at least one outlet chamber.

25. A method of claim 24 wherein the fluid is water.

26. A method of mixing fluid in a valve comprising:
(A) passing a pressurized first fluid into a first inlet chamber and passing a pressurized second fluid into a second inlet chamber of a valve housing containing a first inlet chamber, a second inlet chamber and a multiplicity of outlet chambers mutually isolated from each other,
(B) providing a controlled flow of fluid from the first inlet chamber into each outlet chamber,
(C) providing a controlled flow of fluid from the second inlet chamber into each outlet chamber thereby providing a mixture of the first fluid and the second fluid to a discharge line through each outlet chamber and
(D) providing controlled flow from the first inlet chamber and the second inlet chamber by operating a means for moving a shaft connecting a means closing the passage to provide fluid flow to the outlet chamber from the first inlet chamber and the second inlet chamber.

27. A method of claim 26 wherein rotational movement is transmitted to the shaft by impinging fluid against a rotor on the shaft.

28. A method of claim 26 wherein rotational movement is transmitted to the shaft by operation of a motor operably connected to the shaft.

29. A method of claim 28 wherein rotational movement is transmitted to the shaft by operation of a drive and gear system operably connected to the shaft.

30. A method of claim 29 wherein clockwise and counterclockwise rotational movement is transmitted to the shaft alternatively from a pinion shaft operably mounted in a spring biased, double solenoid system attached to the valve housing, the double solenoid system mounted to position the pinion gear to mesh alternatively with the gear teeth on the gear wheel extensions, thereby alternatively moving the rotor shaft clockwise and counterclockwise to control flow of fluid from an inlet chamber into at least one outlet chamber.

31. A method for providing mixed fluids at a delivery point removed from the location at which the fluids are mixed comprising controlling the mixing of fluid in a valve by the method of claim 28 from a point of delivery removed from the location of the valve.

32. A method of claim 31 wherein the mixing function is controlled to provide an intermittent flow of cold and tempered water.

33. A method of providing mixed fluids at a delivery point removed from the location at which the fluids are mixed comprising controlling the mixing of fluid in a multiplicity of valves by the method of claim 28 from a point of delivery removed from the location of the valve.

34. A method of claim 33 wherein the mixing function is controlled to provide a specific temperature of the delivered water.

35. A method of claim 26 wherein translational movement is transmitted to the shaft to control flow of fluid from an inlet chamber into at least one outlet chamber.

36. A method of claim 35 wherein translational movement from a solenoid system attached to the shaft is transmitted to the shaft to control flow of fluid from an inlet chamber into at least one outlet chamber.

37. A method for providing mixed fluids at a delivery point removed from the location at which the fluids are mixed comprising controlling the mixing of fluid in a valve by the method of claim 35 from a point of delivery removed from the location of the valve.

38. A method of claim 37 wherein the mixing function is controlled to provide an intermittent flow of cold and tempered water.

39. A method for providing mixed fluids at a delivery point removed from the location at which the fluids are mixed comprising controlling the mixing of fluid in a multiplicity of valves by the method of claim 35 from a point of delivery removed from the location of the valve.

40. A method of claim 39 wherein the mixing function is controlled to provide a specific temperature of the delivered water.

41. A method for providing mixed fluids at a delivery point removed from the location at which the fluids are mixed comprising controlling the mixing of fluid in a valve by the method of claim 26 from a point of delivery removed from the location of the valve.

42. A method of claim 41 wherein the mixing function is controlled to provide an intermittent flow of cold and tempered water.

43. A method of claim 41 wherein the mixing function is controlled to provide a specific temperature of the delivered water.

44. A method for providing mixed fluids at a delivery point removed from the location at which the fluids are mixed comprising controlling the mixing of fluid in a multiplicity of valves by the method of claim 26 from a point of delivery removed from the location of the valve.

* * * * *